(12) United States Patent
Vacanti

(10) Patent No.: US 11,143,756 B2
(45) Date of Patent: Oct. 12, 2021

(54) METHODS FOR A MULTI-FUNCTION ELECTRONICALLY STEERED WEATHER RADAR

(71) Applicant: Honeywell International Inc., Charlotte, NC (US)

(72) Inventor: David C. Vacanti, Renton, WA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/001,781

(22) Filed: Aug. 25, 2020

(65) Prior Publication Data
US 2021/0132219 A1  May 6, 2021

Related U.S. Application Data

(63) Continuation of application No. 15/457,844, filed on Mar. 13, 2017, now Pat. No. 10,775,498.

(51) Int. Cl.
*G01S 13/95* (2006.01)
*G01S 13/44* (2006.01)
(Continued)

(52) U.S. Cl.
CPC .............. *G01S 13/953* (2013.01); *G01S 7/35* (2013.01); *G01S 13/34* (2013.01);
(Continued)

(58) Field of Classification Search
CPC ........ G01S 13/953; G01S 13/933; G01S 7/35; G01S 13/34; G01S 13/4463; G01S 13/4472
See application file for complete search history.

(56) References Cited

U.S. PATENT DOCUMENTS 7,019,682 B1   3/2006   Louberg et al.
7,034,753 B1   4/2006   Elsallal et al.
(Continued)

FOREIGN PATENT DOCUMENTS

CA    2015577 A1    12/2008
CN    205374737 U    7/2016
(Continued)

OTHER PUBLICATIONS

Extended European Search Report from counterpart European Patent Application No. 18161104.7, dated Aug. 9, 2018, 7 pp.
(Continued)

*Primary Examiner* — Marc Anthony Armand
(74) *Attorney, Agent, or Firm* — Shumaker & Sieffert, P.A.

(57) ABSTRACT

A weather radar with a transmission antenna array that outputs a high aspect ratio FMCW transmission beam that illuminates an area in the field of regard in elevation and may be electronically scanned in azimuth. The weather radar includes a receive array and receive electronics that may receive the reflected return radar signals and electronically form a plurality of receive beams that may be used to determine characteristics of the area in the field of regard. The receive beams may be used to determine reflectivity of weather systems and provide a coherent weather picture. The weather radar may simultaneously process the receive signals into monopulse beams that may be used for accurate navigation as well as detection and tracking of objects, such as birds, aircraft, UAVs and the like.

8 Claims, 12 Drawing Sheets

(51) Int. Cl.
*G01S 7/35* (2006.01)
*G01S 13/34* (2006.01)
*G01S 13/933* (2020.01)
*G01S 13/02* (2006.01)

(52) U.S. Cl.
CPC ...... *G01S 13/4463* (2013.01); *G01S 13/4472* (2013.01); *G01S 13/933* (2020.01); *G01S 2013/0245* (2013.01); *G01S 2013/0254* (2013.01); *Y02A 90/10* (2018.01)

(56) References Cited

U.S. PATENT DOCUMENTS

| | | |
|---|---|---|
| 7,889,117 B1 | 2/2011 | Woodell et al. |
| 7,948,429 B2 | 5/2011 | Drake et al. |
| 8,009,080 B2 | 8/2011 | Mizutani et al. |
| 8,077,078 B1 | 12/2011 | Woodell et al. |
| 8,558,735 B2 | 10/2013 | Bachmann et al. |
| 8,723,719 B1 | 5/2014 | Piesinger |
| 8,736,484 B2 | 5/2014 | Yu et al. |
| 8,988,274 B2 | 3/2015 | Zhang et al. |
| 8,988,278 B2 | 3/2015 | Lee et al. |
| 9,024,805 B1 | 5/2015 | Jinkins et al. |
| 9,057,773 B1 | 6/2015 | Fersdahl et al. |
| 9,116,244 B1 | 8/2015 | West et al. |
| 9,128,189 B1 | 9/2015 | West et al. |
| 9,182,485 B1 | 11/2015 | Andrews et al. |
| 9,297,896 B1 | 3/2016 | Andrews |
| 9,310,481 B2 | 4/2016 | Henderson et al. |
| 9,384,586 B1 | 7/2016 | McCusker et al. |
| 9,395,438 B1 | 7/2016 | Woodell et al. |
| 9,411,044 B1 | 8/2016 | Sperling et al. |
| 9,568,602 B1 | 2/2017 | Stadelmann et al. |
| 2007/0018882 A1* | 1/2007 | Manoogian ......... G01S 13/4418 342/80 |
| 2011/0160941 A1 | 6/2011 | Garrec et al. |
| 2013/0079957 A1* | 3/2013 | Malka ................. G01S 13/953 701/14 |
| 2014/0278109 A1 | 9/2014 | Henderson et al. |
| 2015/0234035 A1 | 8/2015 | Lohoefener et al. |
| 2017/0041038 A1 | 2/2017 | Kirkpatrick et al. |
| 2018/0259641 A1 | 9/2018 | Vacanti |

FOREIGN PATENT DOCUMENTS

| | | | |
|---|---|---|---|
| EP | 2857858 A1 | 4/2015 | |
| EP | 2857858 * | 8/2015 | .......... G01S 13/953 |
| WO | 2016115024 A1 | 7/2016 | |

OTHER PUBLICATIONS

Response to Extended Search Report dated Aug. 9, 2018, from counterpart European Application No. 18161104.7, filed Nov. 14, 2018, 14 pp.
Green et al., "Comments on Proposed Rule Changes for Spectrum Analyzers and Weather Radar," International Traffic in Arms Regulations (ITAR), Aug.-Sep. 2013, 163 pp.
Elkind, Andrew R., "Regarding Notice of Proposed Rulemaking, ITAR Category XI," International Traffic in Arms Regulations (ITAR), Sep. 6, 2013. 22 pp.
Multi-function Phased Array Radar and Cylindrical Polarized Phased Array Radar, National Oceanic and Atmospheric Administration, National Severe Storms Laboratory, Feb. 25, 2015, 16 pp.
Talisa, et al., "Benefits of Digital Phased Array Radars," Proceedings of the IEEE, vol. 104, No. 3, Mar. 2016, pp. 530-543.
Dr. Herd, "Multifunction Phased Array Radar Panel," MIT Lincoln Laboratory, Jan. 2011, 2 pp.
Torres, et al., "Adaptive-Weather-Surveillance and Multifunction Capabilities of the National Weather Radar Testbed Phased Array Radar," Proceedings of the IEEE, vol. 104, No. 3, Mar. 2016, pp. 660-672.
Zrnic, et al. "Scanning Strategy for the Multifunction Phased-Array Radar to Satisfy Aviation and Meteorological Needs," IEEE Geoscience and Remote Sensing Letters, vol. 12, No. 6, Jun. 2015, pp. 1204-1208.
U.S. Appl. No. 14/488,129, filed by David C. Vacanti, filed Sep. 16, 2014.
U.S. Appl. No. 14/488,154, filed by David C. Vacanti, filed Sep. 16, 2014,
Prosecution History from U.S. Appl. No. 15/457,844, dated Feb. 27, 2019 through May 12, 2020, 131 pp.
Examination Report from counterpart European Application No. 18161104.7, dated Mar. 12, 2021, 5 pp.
Response to Examination Report dated Mar. 12, 2021, from counterpart European Application No. 18161104.7, filed Jul. 12, 2021, 12 pp.

* cited by examiner

```
┌─────────────────────────────────────────────────────────────┐
│ CONTROL A TRANSMIT ARRAY COMPRISING A PLURALITY OF TRANSMIT │ 200
│ ANTENNA ELEMENTS TO OUTPUT A FREQUENCY MODULATED CONTINUOUS │
│ WAVE (FMCW) TRANSMIT BEAM, WHEREIN THE PLURALITY OF TRANSMIT│
│ ANTENNA ELEMENTS ARE ARRANGED SUCH THAT A NUMBER OF TRANSMIT│
│ ANTENNA ELEMENTS IN A FIRST TRANSMIT ARRAY DIMENSION IS     │
│ GREATER THAN A NUMBER OF TRANSMIT ANTENNA ELEMENTS IN A     │
│ SECOND TRANSMIT ARRAY DIMENSION SUBSTANTIALLY PERPENDICULAR │
│ TO THE FIRST TRANSMIT ARRAY DIMENSION, AND WHEREIN THE FMCW │
│ TRANSMIT BEAM ILLUMINATES AN AREA WITH A GREATER EXTENT IN  │
│ A FIRST ILLUMINATION DIMENSION THAN IN A SECOND ILLUMINATION│
│ DIMENSION SUBSTANTIALLY PERPENDICULAR TO THE FIRST          │
│ ILLUMINATION DIMENSION                                      │
└─────────────────────────────────────────────────────────────┘
                              │
                              ▼
┌─────────────────────────────────────────────────────────────┐
│ CONTROL THE TRANSMIT ELECTRONICS TO ELECTRONICALLY SCAN THE │ 202
│ FMCW TRANSMIT BEAM IN THE SECOND ILLUMINATION DIMENSION     │
└─────────────────────────────────────────────────────────────┘
                              │
                              ▼
┌─────────────────────────────────────────────────────────────┐
│ CONTROL THE RECEIVE ELECTRONICS TO RECEIVE A PLURALITY OF   │ 204
│ RECEIVE SIGNALS FROM A RECEIVE ARRAY COMPRISING A PLURALITY │
│ OF RECEIVE ANTENNA ELEMENTS; AND                            │
└─────────────────────────────────────────────────────────────┘
                              │
                              ▼
┌─────────────────────────────────────────────────────────────┐
│ CONTROL THE RECEIVE ELECTRONICS TO ELECTRONICALLY GENERATE  │
│ AND SCAN IN THE SECOND ILLUMINATION DIMENSION A PLURALITY OF│
│ RECEIVE BEAMS SUCH THAT THE SCANNING OF EACH RECEIVE BEAM IS│ 206
│ COORDINATED WITH THE SCANNING OF THE FMCW TRANSMIT BEAM SO  │
│ THAT THE PLURALITY OF RECEIVE BEAMS ARE WITHIN THE AREA     │
│ ILLUMINATED BY THE FMCW TRANSMIT BEAM THROUGHOUT THE        │
│ SCANNING OF THE FMCW TRANSMIT BEAM AND THE PLURALITY OF     │
│ RECEIVE BEAMS IN THE SECOND ILLUMINATION DIMENSION; AND     │
└─────────────────────────────────────────────────────────────┘
                              │
                              ▼
┌─────────────────────────────────────────────────────────────┐
│ DETERMINE ONE OR MORE CHARACTERISTICS OF A SUB-AREA OF A    │ 208
│ PLURALITY OF SUB-AREAS OF THE AREA ILLUMINATED BY THE FMCW  │
│ TRANSMIT BEAM, WHEREIN THE SUB-AREA OF THE PLURALITY OF     │
│ SUB-AREAS IS WITHIN A RECEIVE BEAM OF THE PLURALITY OF      │
│ RECEIVE BEAMS                                               │
└─────────────────────────────────────────────────────────────┘
```

FIG. 11

METHODS FOR A MULTI-FUNCTION ELECTRONICALLY STEERED WEATHER RADAR

This application is a continuation of U.S. patent application Ser. No. 15/457,844, which was filed on Mar. 13, 2017, and entitled "METHODS FOR A MULTI-FUNCTION ELECTRONICALLY STEERED WEATHER RADAR," the entire content of which is incorporated herein by reference.

TECHNICAL FIELD

The disclosure relates to weather radar.

BACKGROUND

Radar systems may be used by aircraft, ground installations or other vehicles to detect weather, other aircraft in the surrounding airspace, and other objects in the surrounding airspace. In smaller aircraft, such as some unmanned aerial vehicles (UAVs), weight and power requirements may constrain the design of the radar system or preclude the use of a radar system altogether. Some weather radars use mechanically or electronically scanned radar transmission pencil beams in a systematic process of progressively covering an area, such as by raster scan.

SUMMARY

In general, this disclosure is directed to a weather radar with a transmission antenna array that outputs a high aspect ratio frequency modulation continuous wave (FMCW) transmission beam that illuminates a large field of regard in elevation and may be electronically scanned in azimuth. The weather radar includes a receive array and receive electronics that may receive the reflected return radar signals and electronically form a plurality of receive beams that may be used to determine characteristics of the area in the field of regard. The receive beams may be used to determine reflectivity of weather systems and provide a coherent weather picture. The weather radar may simultaneously process the receive signals into monopulse beams that may be used for accurate navigation as well as detection and tracking of objects, such as birds, aircraft, unmanned aerial vehicles and the like.

The weather radar may be mounted on a vehicle, such as an aircraft, unmanned aerial vehicles (UAV). The weather radar system may include one or more FMCW radar devices that each include a transmission array, transmission electronics, a receive array, receive electronics and signal processing circuitry.

In one example, the disclosure is directed to a frequency modulation continuous wave (FMCW) radar device, the device comprising: a transmit array comprising a plurality of transmit antenna elements, wherein the transmit array is configured to output an FMCW transmit beam that illuminates an area with a greater extent in a first illumination direction than in a second illumination direction. The second illumination direction is substantially perpendicular to the first illumination direction. The FMCW radar device includes transmit electronics operable to electronically scan the FMCW transmit beam in the second illumination direction, a receive array comprising a plurality of receive antenna elements; and receive electronics operable to: receive a plurality of receive signals, and generate, using the plurality of receive signals, a plurality of receive beams within the area illuminated by the FMCW transmit beam and electronically scan each receive beam of the plurality of receive beams in the second illumination direction such that the scanning of each receive beam is coordinated with the scanning of the FMCW transmit beam in the second illumination direction. The FMCW radar device further includes processing circuitry operable to determine one or more characteristics of a plurality of sub-areas of the area illuminated by the FMCW transmit beam, wherein a sub-area of the plurality of sub-areas is within a receive beam of the plurality of receive beams.

In another example, the disclosure is directed to a weather radar system, the system comprising a plurality of frequency modulated continuous wave transmit beam (FMCW) radar devices. Each respective device comprises: a transmit array comprising a plurality of transmit antenna elements, wherein the transmit array is configured to output an FMCW transmit beam that illuminates an area with a greater extent in a first illumination direction than in a second illumination direction, wherein the second illumination direction is substantially perpendicular to the first illumination direction, transmit electronics operable to electronically scan the FMCW transmit beam in the second illumination direction, a receive array comprising a plurality of receive antenna elements, and receive electronics operable to: receive a plurality of receive signals, generate, using a plurality of receive signals received from the receive array, a plurality of receive beams within the area illuminated by the FMCW transmit beam and electronically scan each receive beam of the plurality of receive beams in the second illumination direction such that the scanning of each receive beam is coordinated with the scanning of the FMCW transmit beam in the second illumination direction. Each FMCW radar device further includes processing circuitry operable to determine one or more characteristics of a plurality of sub-areas of the area illuminated by the FMCW transmit beam, wherein a sub-area of the plurality of sub-areas is within a receive beam of the plurality of receive beams.

In another example, the disclosure is directed to a method comprising: controlling, by processing circuitry, a transmit array comprising a plurality of transmit antenna elements to output a frequency modulated continuous wave (FMCW) transmit beam, wherein the plurality of transmit antenna elements are arranged such that a number of transmit antenna elements in a first transmit array dimension is greater than a number of transmit antenna elements in a second transmit array dimension substantially perpendicular to the first transmit array dimension, and wherein the FMCW transmit beam illuminates an area with a greater extent in a first illumination direction than in a second illumination direction substantially perpendicular to the first illumination direction, controlling, by processing circuitry, transmit electronics to electronically scan the FMCW transmit beam in the second illumination direction, controlling, by processing circuitry, receive electronics to receive a plurality of receive signals from a receive array comprising a plurality of receive antenna elements; and controlling, by processing circuitry, the receive electronics to electronically generate and scan in the second illumination direction a plurality of receive beams such that the scanning of each receive beam is coordinated with the scanning of the FMCW transmit beam so that the plurality of receive beams are within the area illuminated by the FMCW transmit beam throughout the scanning of the FMCW transmit beam and the plurality of receive beams in the second illumination direction, and determining, by processing circuitry, one or more characteristics of a sub-area of a plurality of sub-areas of the area illuminated by the FMCW transmit beam, wherein the sub-area of the plurality of sub-areas is within a receive beam of the plurality of receive beams.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

FIG. 11 is a flow diagram illustrating an example operation of a multi-function electronically steered weather radar.

DETAILED DESCRIPTION

Figure 1A:
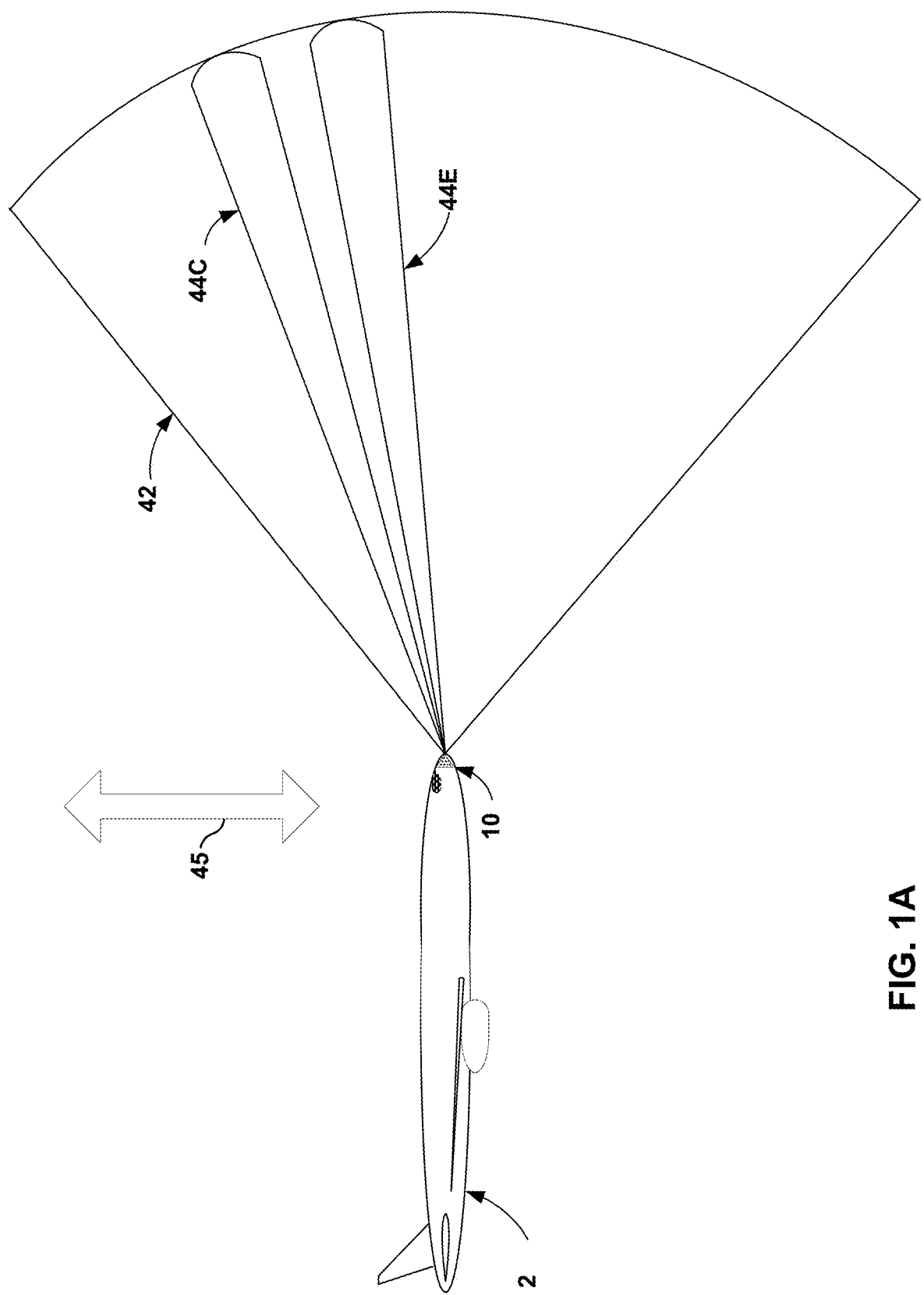
FIG. 1A is a block diagram illustrating a multi-function, electronically steered weather radar installed in an aircraft.

The disclosure is directed to a weather radar with a transmission antenna array that outputs a high aspect ratio (e.g., a high elevation to azimuth ratio) frequency modulation continuous wave (FMCW) transmission beam that illuminates an area in the field of regard in elevation and may be electronically scanned in azimuth. The weather radar includes a receive array and receive electronics that may receive the reflected return radar signals and electronically form a plurality of receive beams that may be used to determine characteristics of the area in the field of regard. The receive beams may be used to determine reflectivity of weather systems and provide a coherent weather picture. The weather radar may simultaneously process the received signals into monopulse beams that may be used for accurate navigation as well as detection and tracking of objects, such as birds, aircraft, unmanned aerial vehicles and the like.

The weather radar may be mounted on a vehicle, such as an aircraft, unmanned aerial vehicles (UAV) or similar vehicle. The weather radar system may include one or more FMCW radar devices that each include a transmission array, transmission electronics, a receive array, receive electronics and signal processing circuitry. The FMCW radar device may be referred to as a digital active phased array (DAPA) radar. The high aspect ratio transmission beam and signal processing of the DAPA radar may provide a variety of operating modes, depending on the phase of flight of an aircraft, or other operation of some other type of vehicle. In the example of an aircraft, the weather radar may be used in a standard weather radar mode to detect weather systems in the path of the aircraft. When operating in mountainous regions, the lower receive beams of the radar may be used for navigation, such as for terrain avoidance. On approach to an airport, or on take-off, various receive beams may be used for weather observation, while other receive beams are simultaneously used to detect hazards on the ground or in the air near the aircraft. Similarly, the beams may be used to simultaneously locate runway approach lights, runway threshold regions, runway surface lights, or other structure that may be used to validate navigation to the desired airport or runway. This may, for example, include validating that the aircraft is approaching the desired runway rather than a nearby taxiway or adjacent parallel runway. Additionally, the monopulse function of the receive beams may be used to measure elevation angle above the runway such that when combined with range information the radar may compute approach glide slope angle. Other navigation features and functions may also be possible. Further, the receive beams may be used singularly or in combination to provide radar images of the runway that includes dimensions of range, azimuth angle and elevation angle or height above the runway surface. Radar imagery may be provided by the monopulse features of the receive beam(s).

Unlike a conventional electronically scanned array (ESA) radar with a single scanned transmit and receive beam, the nature of the multiple simultaneous receive beams of this disclosure allow multiple functions to be accomplished effectively simultaneously, i.e. at substantially the same time. For example, radar imagery of the ground, weather, predictive wind shear, UAV detection and bird detection, as examples, may be accomplished in one or more receive beams, in combination or separately. This is substantially different from existing or proposed state of the art ESA radars where a single antenna beam is electronically scanned in a raster or other pattern in an attempt to accomplish more than one task.

FMCW radar operation may provide advantages over pulsed or other types of radar systems because FMCW permits any desired range resolution and a minimum detection range that is equal to the range resolution of the radar. For example, during operation in the air the radar may use with modest range resolution, with larger range bins. During ground operations FMCW radar allows very fine range resolution on the order of a meter or less such as while in taxi on the runway or taxi way areas of an airport.

This same set of multiple beams may be used for marine radar applications where a radar system according to the techniques of this disclosure may measure elevation angle unlike conventional marine radars, which do not measure elevation. Therefore, a marine radar that functions according to this disclosure with a wide field of regard in elevation may permit the detection of air vehicles such as a UAV with upper receive beams at the same time as the lower beams are mapping the water surface for targets, navigation aids, or shorelines. Currently small mechanically scanned marine radars use a very large elevation beamwidth of ~22 degrees to accommodate pitch and roll of the marine vehicle but makes no elevation angle measurement. The set of multiple beams according to the techniques in this disclosure may permit a marine radar to provide multiple functions in a relatively small package suitable for armed forces, police or other civil defense functions to cover both air and surface surroundings. Motion of the vehicle may be electronically removed via electronic receive beam elevation scanning.

Similarly, ground-based vehicles that accompany military forces may use a multiple receive beam FMCW radar as described in this disclosure to provide threat detection, such as a UAV or other threats, that may pose a danger to deploy weapons on troops, vessels or vehicles. The multiple receive beams of an FMCW radar according to the techniques of this disclosure may rapidly search a very large volume in just one azimuth pass of the high aspect ratio transmit antenna pattern. Coverage of the very large search volume and tracking large numbers of targets are both difficult, if not impossible, for a single beam, raster scanned ESA radar. Therefore, an FMCW radar according to this disclosure may provide significant advantages over a single beam ESA radar.

FIG. 1A is a block diagram illustrating a multi-function, electronically steered weather radar installed in aircraft 2. Although FIG. 1 is shown with respect to an aircraft, and specifically to an airplane, the weather radar system may also be installed in a variety of other types of vehicles, including ground vehicles, unmanned aerial vehicles (UAV), helicopters, marine vehicles, and similar vehicles.

FIG. 1A depicts aircraft 2, which includes a weather radar system 10 that outputs an FMCW transmit beam 42 that illuminates an area in a first illumination direction 45. In the example of FIG. 1A the first illumination direction 45 is in elevation and, in some examples, may be at least +/−30 degrees with respect to weather radar system 10. Transmit beam 42 simultaneously illuminates the area in the first illumination direction in front of aircraft 2. The weather radar system depicted in FIG. 1A may scan the FMCW transmit beam in azimuth. In some examples, weather radar system 10 may not scan the FMCW transmit beam in elevation, yet still illuminate the area in front of aircraft 2.

Weather radar system 10 may receive a plurality of receive signals reflected from objects or weather in front of aircraft 2. Weather radar system 10 may generate, using the plurality of receive signals, a plurality of receive beams 44C and 44E within the area illuminated by the FMCW transmit beam 42. In some examples, the digitally formed receive beams may be monopulse beams used to track objects within the field of regard (FOR) of weather radar system 10. In other examples, the receive beams may be FMCW receive beams used to analyze weather, such as precipitation, within the field of regard of weather radar system 10.

Figure 1B:
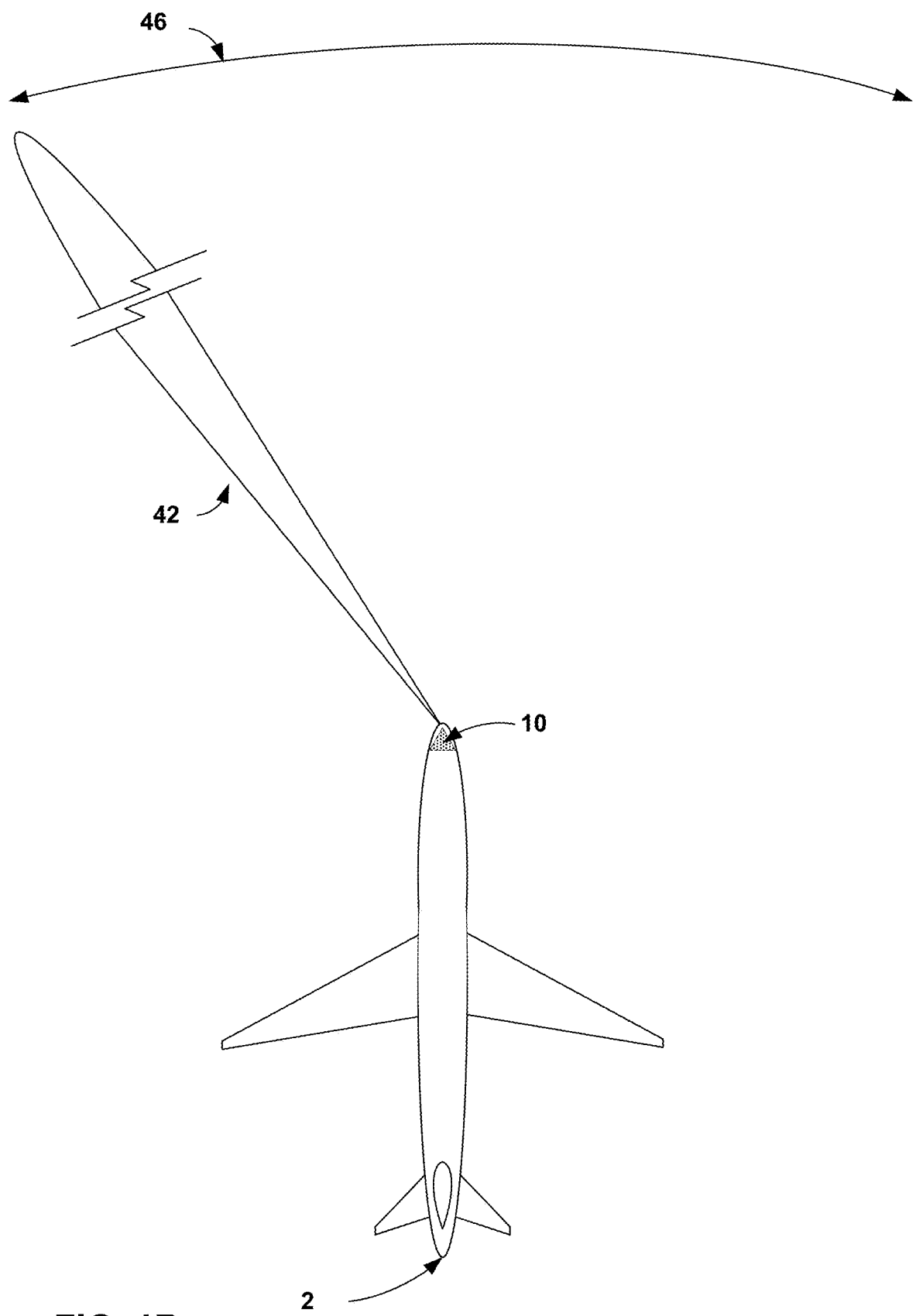
FIG. 1B is a top view depiction of an aircraft, which includes a weather radar system that output an FMCW transmit beam that illuminates an area in a first illumination direction and scans the FMCW transmit beam in a second illumination direction.

FIG. 1B is a top view depiction of aircraft 2, which includes a weather radar system that outputs an FMCW transmit beam 42 that illuminates an area in a first illumination direction (e.g. in and out of the page) and scans the FMCW transmit beam 42 in a second illumination direction 46. Illumination direction 45 of FIG. 1A generally runs into and out of the page with respect to FIG. 1B. Illumination direction 46 of FIG. 1B generally runs into and out of the page with respect to FIG. 1A. Comparing the beam width of the top view of FIG. 1B to the side view of FIG. 1A depicts FMCW transmit beam 42 with a high aspect ratio. In other words, FMCW transmit beam 42 illuminates an area with a greater extent in a first illumination direction (e.g., illumination direction 45 in FIGS. 1A and 2) than in a second illumination direction (e.g., illumination direction 46, in FIGS. 1B and 2) wherein the second illumination direction 46 is substantially perpendicular to the first illumination direction 45.

Aircraft 2 includes weather radar system 10, installed in the forward portion of aircraft 2. Radar system 10 may be installed in the nose of aircraft 2 and protected by a radome. In other examples, radar system 10 may be installed in a wing pod, or other similar structure, on aircraft 2. Though radar system 10 may be used in a variety of applications, this disclosure will focus on the application as a weather radar in an aircraft, to simplify and clarify the description.

Radar system 10 may include one or more FMCW radar devices which may be mounted to a frame attached to aircraft 2. In the example of radar system 10 with two or more FMCW radar devices, the frame may be configured to hold the plurality of devices at an angle with respect to each other. The FMCW radar devices may include a plurality of transmit and receive arrays. The FMCW radar device may include transmit electronics and a transmit array including a plurality of transmit antenna elements. The transmit electronics with the transmit array may be configured to output FMCW transmit beam 42 electronically scan FMCW transmit beam 42 in the second illumination direction 46, which is in azimuth, or the horizontal beamwidth in the example of FIG. 1B.

An FMCW radar device may electronically scan transmit beam 42 approximately forty-five degrees on either side of a centerline, relative to the FMCW radar device. In some examples FMCW radar device may scan transmit beam 42 up to plus or minus sixty degrees. The FMCW radar device controls beam steering by phase shifting the output of a transmit array, which will be explained in more detail below in relation to FIG. 4. FMCW radar device may adjust azimuth beamwidth and gain by digitally turning off elements at the edge of the transmit array. In some examples, turning off elements may also require adjusting the amplitude taper across the array under software control. In some examples, amplitude taper may be provided by a variable gain amplifier (VGA) in each column of the transmit array. Therefore, the beamwidth of transmit beam 42 may be increased for special applications under software control, which will be described in more detail below, for example in Table 1. FMCW radar device transmit array may be used across radar S, C, X, Ku, K or Ka bands.

The FMCW radar device may analyze many areas within the field of regard of the radar. For example, the FMCW radar device may receive reflections from a first area illuminated by the FMCW transmit beam 42 at a first azimuth relative to the transmit array. The FMCW radar device may receive reflections from a second area illuminated by the FMCW transmit beam is at a second azimuth relative to the transmit array. The FMCW radar device may process the received signals to determine reflectivity or other characteristics of each area.

The FMCW radar device may also include receive electronics and a receive array comprising a plurality of receive antenna elements. The receive array may receive a plurality of receive signals, reflected from objects illuminated by FMCW transmit beam 42. The receive electronics may generate, using the plurality of receive signals, a plurality of receive beams within the area illuminated by the FMCW transmit beam 42, such as receive beams 44C and 44E depicted in FIG. 1A. The FMCW radar device may include processing circuitry that determine one or more characteristics of a plurality of sub-areas of the area illuminated by FMCW transmit beam 42, wherein a sub-area of the plurality of sub-areas is within a receive beam of the plurality of receive beams. Because FMCW transmit beam 42 has a high aspect ratio, the processing circuitry may further determine the one or more characteristics of a first sub-area of a plurality of sub-areas for the first area at the first azimuth at substantially the same time as a second sub-area of the plurality of sub-areas for the first area at the first azimuth. This is because FMCW transmit beam 42 simultaneously illuminates the first illumination direction, which is elevation in the example of FIGS. 1A-1B.

Figure 2:
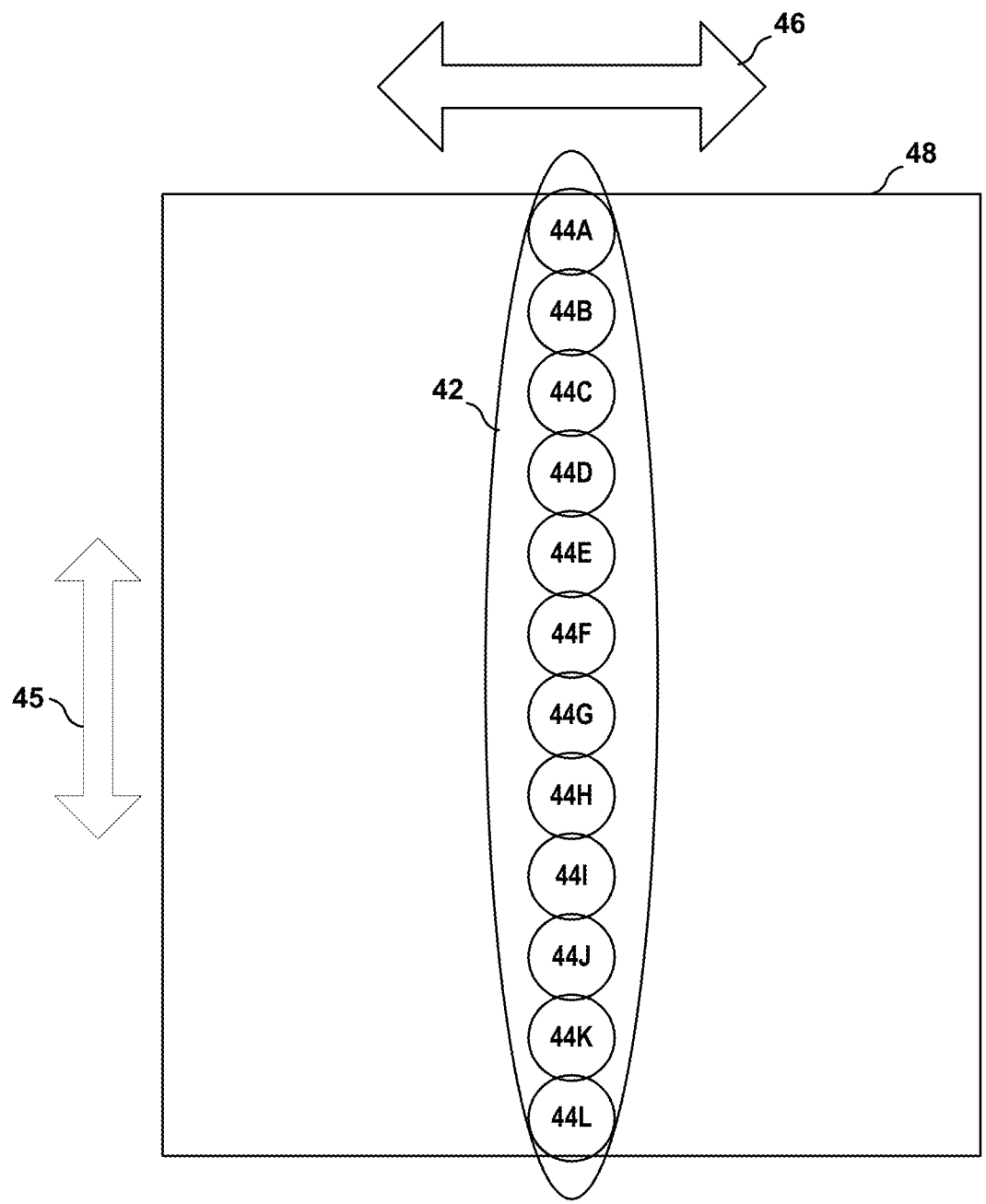
FIG. 2 is a conceptual diagram illustrating an example transmit beam and a plurality of example receive beams, which may be generated using a transmit array and a receive array.

FIG. 2 is a conceptual diagram illustrating an example transmit beam 42 and a plurality of example receive beams 44A-44L, which may be generated using a transmit array 18 and a receive array 20, described in more detail in FIG. 3 below. Transmit beam 42 may, for example, be the same as FMCW transmit beam 42 depicted in FIGS. 1A-1B. Transmit beam 42 is depicted as being approximately elliptical in shape, with a greater extent in elevation than in azimuth. FIG. 2 also depicts a representation of a predetermined area 48 which is to be illuminated by FMCW radar system 10 (FIG. 1B). As shown in FIG. 2, transmit beam 42 may be at least as tall in elevation as the elevation of predetermined area 48, such that transmit beam 42 illuminates the entire elevation of a section of predetermined area 48 without steering or scanning transmit beam 42 in elevation. In other examples, transmit beam 42 may be wide in azimuth and short in elevation. In general, transmit beam 42 may have a greater extent in a first illumination direction 45 than in a second illumination direction 46 substantially perpendicular to the first illumination direction 45. In other words, the transmit beam has a high aspect ratio, which in some examples is at least 10:1. In some examples, the beamwidth in the second illumination direction is approximately four to eight degrees while the beam width in the first illumination direction is approximately 60 degrees. In the example of FIG. 2, the first illumination direction is the vertical beamwidth and the second illumination direction is the horizontal beamwidth.

In the example of a weather radar mounted on an aircraft, as depicted in FIG. 1A, where the aircraft is flying at a normal cruising altitude of approximately 30,000 feet (8000 to 10,000 meters), the transmit beam in the first illumination direction 45 may reflect from targets or weather on the ground and as high as the troposphere without scanning in elevation. In other words, at a given point in time, transmit beam 42 may simultaneously transmit radar energy from radar system 10 to illuminate the entire vertical dimension of predetermined area 48 in the first illumination direction 45.

Illuminating the entire vertical dimension may provide several advantages over conventional radar that must raster scan a pencil beam in both elevation and azimuth to illuminate predetermined area 48. Unlike conventional radar that must use a raster scan pencil beam, Radar system 10 may sweep transmit beam 42 in azimuth only and thus illuminate predetermined area 48 more quickly. As a result, a radar system according to the techniques of this disclosure may allow transmit beam 42 to be available to concentrate on storms vertically and to scan over a limited azimuth extent with full instantaneous vertical extent. Some advantages may include providing a coherent weather picture of certain weather systems, such as a thunderstorm that may extend for thousands of feet in altitude. For example, radar energy in transmit beam 42 transmitted at a given time may simultaneously illuminate a sub-region of predetermined area 48.

In the example of a thunderstorm, though the reflected return signals may arrive at the receive elements of Radar system 10 at different times, depending on the range of the features of the thunderstorm from radar system 10 receive electronics within radar system 10 may process the signals and assemble a coherent weather analysis without as many complex adjustments to compensate for movement of the aircraft as is required for a conventional pencil beam raster scan radar. For example, a jet aircraft may travel several hundred meters over the time period it takes a pencil beam to scan in elevation. A raster scan radar receiver processor must account for all the different positions the aircraft was in for each different transmission elevation angle. In contrast, a radar system in accordance with the techniques of this disclosure, may only need to account for a single aircraft position for a transmission that illuminates the entire vertical dimension of predetermined area 48 in the first illumination direction 45.

In addition to simplified processing, this single transmission time to illuminate the range of elevation may offer other advantages, such as faster update times. A radar system in accordance with the techniques of this disclosure may repeatedly illuminate predetermined area 48 in less time than it may take a raster scan radar with a pencil beam. This may be advantageous for rapidly changing conditions, fast moving targets or detecting items that are close to the aircraft. The transmission array, and associated transmit electronics, for the high aspect ratio transmit beam, may be less complex and consume significantly less power than transmit electronics required for an ESA radar with a pencil beam. This may reduce power consumption and heat dissipation requirements for the FMCW radar device, as well as allow the FMCW radar device to be smaller and less expensive. Other advantages will be described in more detail below.

Figure 3:
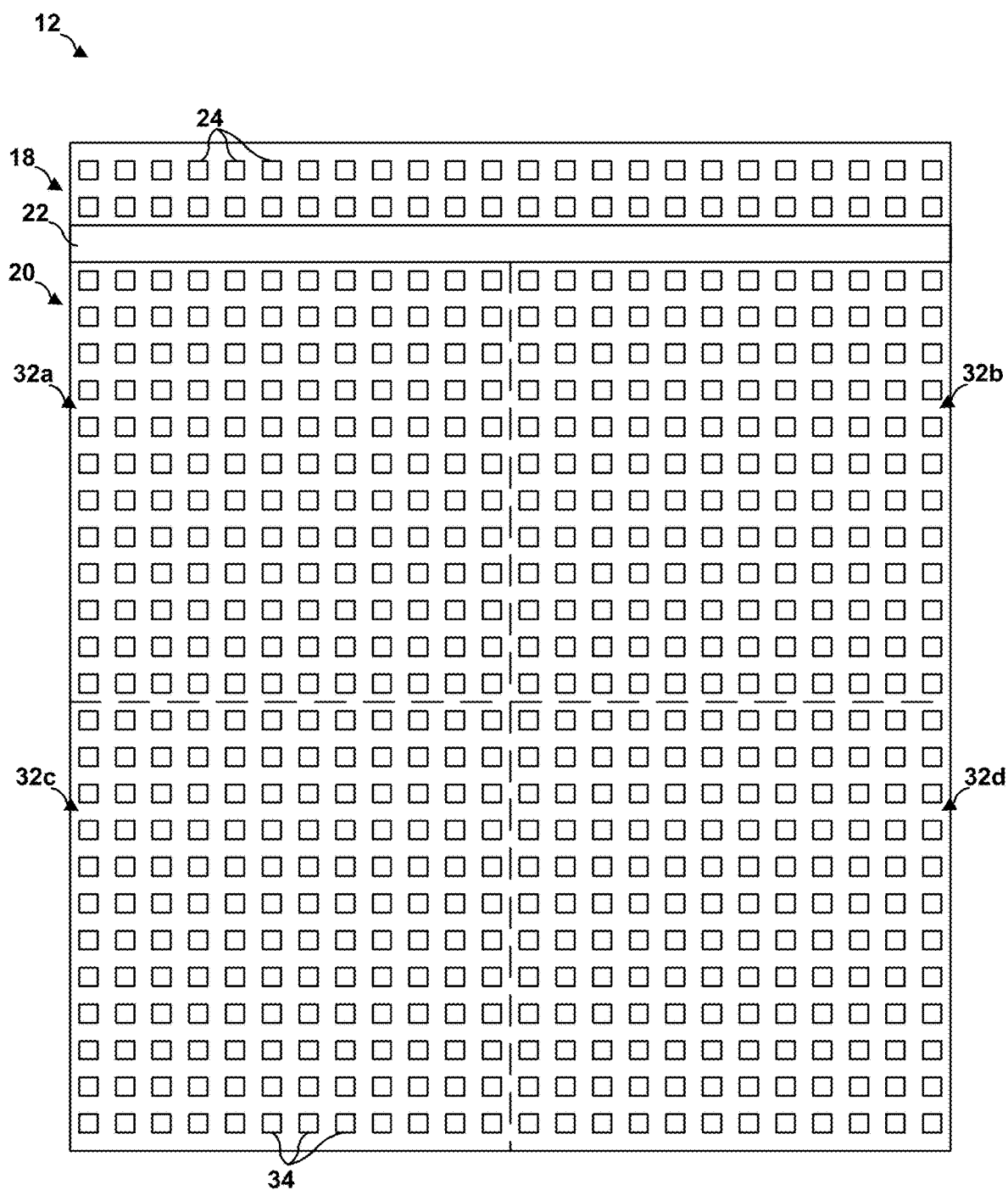
FIG. 3 is a conceptual diagram illustrating another conceptual view of an example FMCW radar array, which may be a component of an FMCW radar device.

Transmit electronics associated with a transmit array, such as transmit array 18 in FIG. 3, may be configured to scan, or steer, transmit beam 42 in azimuth (e.g., the second illumination direction), as indicated by arrow 46. In some examples, the transmit electronics may be configured to apply a phase shift to each transmit antenna element of the plurality of transmit antenna elements (for example, transmit elements 24 described in FIG. 3) which changes as a function of time. Shifting the phase as a function of time results in transmit beam 42 being scanned in azimuth.

Receive electronics associated with a receive array (e.g. receive array 20 depicted in FIG. 3) is configured to electronically generate the plurality of receive beams 44. Receive beams 44C and 44E depicted in FIG. 2 are similar to receive beams 44C and 44E depicted in FIG. 1B. Although twelve receive beams 44 are illustrated in FIG. 2, in other examples, the receive electronics may be configured to generate more or fewer receive beams 44 using a receive array. For example, the receive electronics associated with the receive array may be configured to generate at least two receive beams 44.

In some examples, the receive electronics associated with the receive array is configured to scan, or steer, each of the plurality of receive beams 44 in the second illumination direction (e.g., azimuth) in parallel with transmit beam 42. For example, the receive electronics associated with the receive array may be configured to scan, or steer, each of the plurality of receive beams 44 in the second illumination direction (e.g., azimuth) such that the plurality of receive beams 44 are scanned at the same rate and to corresponding locations so that the plurality of receive beams 44 are substantially always (e.g., always or nearly always) located within the area illuminated by transmit beam 42.

The receive beams may be generated electronically, such as through digital beam forming (DBF) circuitry. A difference between scanning the transmit beam 42 and scanning the receive beams 44 is that the transmit beam 42 may physically change azimuth with respect to radar system 10. As with a conventional weather radar system having a mechanically scanned transmit antenna, the radar energy in transmit beam 42 leaves radar system 10 at different angles of azimuth at different times. The high aspect ratio transmit beam 42 illuminates the range of elevation for each azimuth angle. For the receive beams, the radar energy from transmit beam 42 reflects from objects in predetermined area 48. Objects may be ice crystals, precipitation, other aircraft, ground-based features, birds, and so on. The reflected energy arrives at receive array 20 (FIG. 3) through each receive array element. The received radar signals from each receive element are processed, e.g. phase shifted, summed and/or combined to electronically form beams within radar system 10. This electronic beam forming occurs within the circuits, processors, and other components of radar system 10.

In some examples, the receive electronics, such as receive electronics 80 described below in relation to FIG. 4, associated with receive array 20 may be configured to scan, or steer, the plurality of receive beams in the second illumination direction (e.g., azimuth) by applying a phase shift to the signals received from each respective receive antenna element of the plurality of receive antenna elements 34. The receive electronics associated with receive array 20 then may process the phase-shifted signals as described below to produce phase-shifted and summed I and Q values for each row of receive antenna elements 34 in each respective quadrant of quadrants 32 (FIG. 3). For example, when each row of receive antenna elements 34 in each respective quadrant of quadrants 32 (FIG. 3) includes twelve elements, the receive electronics associated with receive array 20 may be configured to generate a single phase-shifted and summed I value and a single phase-shifted and summed Q value for each row of twelve receive antenna elements 34 each time the receive array 20 is digitally sampled.

The receive electronics associated with receive array 20 also may be configured generate the plurality of receive beams 44 at predetermined first illumination direction (e.g., elevation) positions by applying a complex beam weight to the phase-shifted and summed I and Q values for each row of each of quadrants 32 (FIG. 3). The phase-shifted and summed I and Q values determined by the receive electronics for a single sample instance may be reused multiple times to generate the corresponding number or receive beams 44 at respective elevation positions. For example, to generate twelve receive beams 44, the receive electronics associated with receive array 20 may apply twelve different complex beam weights to the phase-shifted and summed I and Q values for each row of each of quadrants 32 in twelve separate operations. The I and Q values may be stored in a memory location within radar system 10 and reused multiple times for additional analysis. As one example, one or more data sets of I and Q values stored over a period of time may be used to generate a synthetic aperture radar (SAR) analysis of an area or sub-area in the vicinity of an aircraft.

The plurality of complex beam weights may correspond to the number of receive beams 44. The values for each of the plurality of complex beam weights may be selected to result in the plurality of receive beams being generated at the respective predetermined elevation positions. As shown in FIG. 2, in some examples, the elevation positions of the plurality of receive beams 44 may be selected to substantially fully cover (e.g., fully cover or nearly fully cover) the elevation extent of the predetermined area 48 which is to be illuminated. In some examples, the adjacent ones of the plurality of receive beams 44 may partially overlap in elevation. In this way, the receive electronics associated with receive array 20 may generate a plurality of receive beams 44 at predetermined first illumination direction (e.g., elevation) positions and scan, or steer, the plurality of receive beams 44 in the second illumination direction (e.g., azimuth). Complex beam weights and other processing may be executed by processing circuitry included in the receive electronics or an external processor controlling the receive electronics.

Additionally, because receive array 20 is conceptually (and, optionally, electrically) divided into quadrants 32, the receive electronics associated with receive array 20 may be configured to generate monopulse tracking beams. This may be used to facilitate tracking of objects by radar system 10. By generating a transmit beam 42 and a plurality of receive beams 44, radar system 10 may perform monopulse analysis for each of receive beams 44, which may facilitate tracking multiple objects within predetermined area 48. For example, by digitally combining the I and Q values for the two left quadrants 32*a* and 32*c* together, digitally combining the I and Q values for the two right quadrants 32*b* and 32*d*, and determining the difference between I and Q values for the two left quadrants 32*a* and 32*c* and the I and Q values for the two right quadrants 32*b* and 32*d*, the receive electronics may create an azimuth monopulse tracking receive beam. Similarly, in some examples, by digitally combining the I and Q values for the top two quadrants 32*a* and 32*b*, and digitally combining the I and Q values for the bottom two quadrants 32*c* and 32*d*, and determining the difference between I and Q values for the two top quadrants 32*a* and 32*b* and the I and Q values for the two bottom quadrants 32*c* and 32*d*, the receive electronics may create an elevation monopulse tracking receive beam. In some examples, by digitally combining the I and Q values for respective rows of all 4 quadrants 32, a reference sum beam may be created for comparison to the azimuth and elevation monopulse tracking beams. This may permit an accurate phase comparison monopulse to be created for each of receive beams 44. Additionally, as each FMCW radar array 12 is configured to generate a transmit beam 42 and a plurality of receive beams 44, which are scanned within a corresponding predetermined window, this may facilitate tracking of multiple objects by radar system 10.

In a normal weather search mode, radar system 10, with one or more FMCW radar devices, may execute a single azimuth pass of transmit beam 42 across the maximum and minimum of the azimuth range. A buffer memory, which may include three-dimensional (3-D) information, may be filled in a three-second single azimuth pass at a range of over 320 nautical miles (NM). Radar system 10 may collect and store a full vertical information of all storm or other weather structures in this single azimuth scan. During flight, the processing circuitry within radar system 10 on aircraft 2 may assemble a coherent mapping of reflectivity characteristics in the first illumination direction. For example, a main indicator in the detection of high altitude ice crystals (HAIC) and high ice water content (HIWC) may be based on the integrated vertical reflectivity of the storm.

A conventional pencil beam radar may take 30 seconds or more to collect data for the entire region in front of the aircraft. Radar system 10 may make the same scan in three seconds. Assembling a raster scan of the data may require complex adjustments for radar beam transmission time and aircraft position, as described above. For example, a conventional pencil beam radar may have to account for changes in range gates, angular changes, and other decorrelation issues caused by the movement of the vehicle during the scan.

An additional advantage of radar system 10 includes forming a coherent weather picture with the high aspect ratio transmission beam during the sum analysis. The reflected return signals for a given azimuth arrive at the receive array as phase coherent and amplitude coherent signals. The phase coherency, for example, may allow vertically integrated reflectivity. Unlike a conventional raster scan radar, radar system 10 may therefore avoid potential noise in the radar signal processing caused by the decorrelation of the returns from a scanned pencil beam. In some examples, radar system 10 may also compute angular Doppler across the beams.

In an enhanced weather mode, radar system 10 may use additional time to perform additional weather analysis. For example, in a 30 second update cycle, radar system 10 may use the remaining 27 seconds after the three-second full azimuth scan to return to storm cell locations to dwell for several frequency modulation periods. Other enhanced weather functions may include additional scans of one or more storm cell regions, change modulation waveforms for Doppler or other measurements, use the receive beams to capture details of one or more storm cells from ground to maximum altitude. Radar system 10 may use an extended dwell capability to repeat HAIC detections over a short period of seconds, or fraction of seconds to verify and validate the HAIC presence. The increased dwell may allow detection of HAIC that is of lower reflectivity. In some examples, during a dwell period, or during a sweep, radar system 10 may adjust the modulation bandwidth or chirp time to optimize detection and analysis in various modes. The analysis may be done over discrete periods of time, which may be called epochs. For example, radar system 10 may cause the transmit beam to dwell at an azimuth for a ten millisecond epoch, while changing the modulation scheme in two millisecond intervals to optimize certain functions or modes. Additional modes are discussed in more detail in Table 1.

In addition to the weather radar functions, the high aspect ratio transmit beam 42 may provide additional functions for vehicles in which radar system 10 is installed. As described above, the high aspect ratio transmit beam, with a wide field of regard in elevation provides several advantages in analyzing weather, when compared to other mechanically or electronically steered pencil beam radars that must use a raster scan to illuminate an area of interest. In the example of an aircraft, radar system 10 may use the plurality of receive beams 44 for analysis beyond weather analysis as well as execute different functions in different phases of flight. For example, lower receive beams may be used for terrain avoidance or terrain following applications while upper beams simultaneously provide airborne target detection or weather detection.

One example of analysis beyond weather analysis may include using the enhanced dwell capability of radar system 10 in conjunction with multiple receive beams arrayed over the high aspect ratio transmit beam (e.g., 60 degrees of elevation) to detect volcanic ash. Radar system 10 may discriminate between cloud and ash reflections via Doppler analysis over an extended period of time, such as one or more seconds. The extended dwell time may provide added signal processing gain for increased sensitivity to search for heavier and more detectable ash below the aircraft. When in the vicinity of known active volcanos, radar system 10 may provide a dedicated scan of the volcano top and air above the volcano to detect possible volcanic eruptions where the ash is the most dense and therefore more detectable. In some examples radar system 10 may perform an optimization process on a waveform to improve range resolution and detection range based on distance to the volcano.

In some examples, radar system 10 may combine radar signal information with a volcano location and height database as part of the terrain map capability. The signal processing in radar system 10 may use multiple receive beams to establish ground level and multiple receive beamwidths to reduce azimuth sidelobe clutter from the ground.

For radar system 10, according to the techniques of this disclosure, all transmit antenna elements of the plurality of transmit antenna elements output FMCW transmit beam 42 at all times during operation of the device. Similarly, all receive antenna elements of the plurality of receive antenna elements receive the plurality of receive signals at all times during the operation of the device. Radar system 10 may include processing circuitry operable to determine one or more characteristics of a plurality of sub-areas of the area illuminated by the FMCW transmit beam, wherein a sub-area of the plurality of sub-areas is within a receive beam of the plurality of receive beams.

Radar system 10 may use additional scans and processing to reduce or eliminate clutter returns. For example, radar system 10 may use stored data sets that include stored radar return signals to increase the beamwidth of the receive beams to create a "guard channel" to determine sidelobe clutter that may cause false PWS Doppler signatures and eliminate those sources. In one example, when operating to reduce or identify clutter returns, such as false returns from sidelobes, radar system 10 may turn off or ignore returns received from some elements of the receive array to effectively increase the receive beam width. Radar system 10 may process returns from the wider beam width to determine whether some received return signals were in the sidelobes, and therefore could be considered clutter, or if the returns were in the main beam. In some examples, radar system 10 may also adjust the gain and frequency of the transmit beam during processing or scans to reduce clutter.

In the example of aircraft 2 approaching for landing, radar system 10 may the plurality of receive beams 44 for other functions. For example, receive beams 44I-44L may function as monopulse receive beams to track objects on or near the ground. For example, receive beams 44I-44L may provide the pilot with a radar picture of the airport that aircraft 2 is approaching. A smooth runway surface typically reflects little radar energy back to radar system 10 and may appear as a black area on the radar. The areas between runways may be composed of turf, gravel or other material and reflect more energy back to radar system 10 which may appear different than a smooth runway. The landing system lighting, runway and taxiway lighting and other features of an airport may also reflect radar energy. The receive array of radar system 10, such as receive array 20, may receive the plurality of return signals and generate monopulse receive beams for receive beams 44I-44L. Monopulse receive beams may provide accurate angle and distance measurements as well as tracking of objects within the sub-areas illuminated by a receive beam. Collision avoidance characteristics of a sub-area may include range, bearing, tracking and size characteristics of an object in the sub-area.

By tracking and depicting the features of the approaching airport, radar system 10 may assist the pilot in determining that aircraft 2 is approaching the correct runway because the expected features of the airport should match the radar picture. This redundancy in navigation may be valuable such as with inadequate GPS coverage, or in cases of GPS and wide area augmentation system (WAAS) malfunction or jamming. In other words, radar system 10 may detect runway approach lights and runway edges for runway alignment and glideslope verification. Signal processing within radar system 10 may implement monopulse azimuth and elevation in one receive beam to provide high angular resolution of runway edge lights and runway approach lights.

Additionally, radar system 10 may assist the pilot in determining if there are hazards on the runway such as ground vehicles, barriers, debris, animals or other hazards. For example, on final approach to a runway, radar system 10 may use one or more receive beams 44 to search the runway for intrusions by vehicles or other aircraft with a dedicated scan for this purpose. Radar system 10 may use a waveform that may optimize range resolution and maximum detection range and monopulse mode for accurate angular resolution. For example, in some modes, radar system 10 may output radar signals with a 100 MHz chirp over one millisecond and in other modes radar system 10 may output radar signals with a 100 MHz chirp over five milliseconds.

Simultaneously with receive beams 44I-44L providing a navigation and ground hazards, receive beams 44A-44C may continue to provide weather information during the approach of aircraft 2 to the airport above and beyond the runway. Receive electronics associated with receive array 20 may generate receive beams 44A-44C as FMCW receive beams to determine the one or more characteristics of a sub-areas within the receive beams. Characteristics such as reflectivity may help determine the weather in the path of aircraft 2.

Simultaneously with receive beams 44I-44L providing a ground picture and receive beams 44A-44C providing weather information, other receive beams may provide collision avoidance, or other functions. For example, receive electronics associated with receive array 20 may generate receive beams 44D-44H as monopulse receive beams to locate and track other aircraft, UAVs, birds, bats or other hazards to aircraft 2. In some examples, radar system 10 may execute a dedicated azimuth scan focused around the runway approach region to detect UAVs, especially small UAVS. Upon detecting a possible UAV, radar system 10 may use dedicated modulation waveforms and monopulse angle measurements to track the UAV. Similarly, radar system 10 may use one or more beams in a dedicated scan to search for bird flocks, along with dedicated waveform, range settings and range resolution, while continuing to perform other radar functions described in this disclosure.

In some examples, radar system 10 may use one or more of receive beams 44D-44H to execute simultaneous predictive wind shear (PWS) analysis of the air mass between aircraft 2 and the approaching airport. The high aspect ratio of transmit beam 42 provides an advantage over a pencil beam radar because radar system 10 scans transmit beam 42 in azimuth without the need to scan in elevation thereby providing more frequent updates. In some examples, radar system 10 may output signals to a synthetic vision system (SVS), which may be valuable in a degraded visibility environment. In addition to aircraft 2, of radar system 10 may be installed in a helicopter, where the output of radar system 10 may be valuable while landing in blowing dust (brown-out) or blowing snow (white-out) conditions. Radar system 10 may interleave all approach phase scans and searches with other radar functions described herein.

The radar system operating according to the techniques of this disclosure may not simultaneously receive return signals that were all transmitted at the same time. For example, the high aspect ratio transmission beam may transmit radar signals for a selected azimuth over the entire elevation simultaneously. Radar signals that reflect from more distant objects arrive at the receive array later than radar signals that reflect from closer objects. During post-processing, radar system 10 may assemble the radar returns from a single chirp, or plurality of chirps, into a coherent picture for a selected azimuth. Radar system 10 may simultaneously perform sum beam processing to determine, for example weather characteristics, as well as monopulse digital beam forming for navigation, collision avoidance or other functions. Some additional functions are described in more detail below in Table 1 below.

FIG. 3 is a conceptual diagram illustrating another conceptual view of an example FMCW radar array 12, which may be a component of FMCW radar device 11, depicted in FIG. 9 below. Radar system 10 may include one or more FMCW radar devices 11, which will be described in more detail in relation to FIG. 10. As in the example of FIG. 3, FMCW radar array 12 includes a transmit array 18 and a receive array 20. Similar to FMCW radar array 12 shown in FIG. 9, the example of FMCW radar array 12 shown in FIG. 3 also includes electronic bandgap (EBG) isolator 22 disposed between the transmit antenna and the receive antenna. Transmit array 18 and receive array 20 are physically proximate to each other, e.g., located in a single housing (e.g. housing 13 shown in FIG. 10).

Transmit array 18 includes a plurality of transmit antenna elements 24. In some examples, transmit array 18 includes two rows (oriented horizontally in the example of FIG. 3) of transmit antenna elements 24, and each row includes twenty-four transmit antenna elements 24. In general, transmit array 18 may include at least one row of transmit antenna elements 24, and each row may include a plurality of antenna elements 24. In some examples, adjacent transmit antenna elements 24 may be spaced apart in the horizontal direction by approximately one-half of the wavelength of the transmit beam generated using transmit array 18.

As shown in FIG. 3, receive array 20 may be conceptually divided into quadrants 32a, 32b, 32c, 32d (collectively, "quadrants 32"). In some examples, receive array 20 is also electrically divided into quadrants 32, e.g., based on the electrical connections of the receive antenna elements 34 to receive electronics that process the signals detected by receive antenna elements 34. Receive signals from each of receive array elements 34 may be used to generate monopulse tracking beams using monopulse beam arithmetic, and dividing receive array 20 into quadrants 32 may facilitate generation of monopulse tracking beams, as described below. In some examples, each of quadrants 32 includes the same number of receive antenna elements 34. For example, in the implementation shown in FIG. 3, each of quadrants 32 includes twelve rows of twelve receive antenna elements 34, for a total of 144 receive antenna elements 34 in each of quadrants 32 (each row is oriented horizontally and each column is oriented vertically in the example of FIG. 3). In other examples, each of quadrants 32 may include 10 rows of receive antenna elements 34, each row including 12 receive antenna elements 34 (for a total of 120 receive antenna elements in each of quadrants 32). Hence, in the illustrated example, receive array 20 includes twenty-four rows of receive antenna elements 34, and each row includes twenty-four receive antenna elements 34. In other examples, receive array 20 may include a different number of receive antenna elements 34. For example, receive array 20 may include more or fewer rows of receive antenna elements 34, and each row may include more or fewer receive antenna elements 34 than depicted in FIG. 3. In general, receive array 20 may include a plurality of rows of receive antenna elements 34 and each row may include a plurality of receive antenna elements 34. In some examples, adjacent receive antenna elements 34 may be spaced apart in the horizontal direction by approximately one-half of the wavelength of the transmit beam generated using transmit array 18.

In some examples, receive antenna elements 34 may be arranged in a square array of receive antenna elements 34 (e.g., the number of rows of receive antenna elements 34 is the same as the number of receive antenna elements 34 in each row). In other examples, receive antenna elements 34 may be arranged in a rectangular arrant of receive antenna elements 34 (e.g., the number of rows of receive antenna elements 34 is different than the number of receive antenna elements 34 in each row). Additionally or alternatively, in some examples, the number of receive antenna elements 34 in a row of receive array 20 may be different than the number of transmit antenna elements 24 in a row of transmit array 18. Alternatively, or additionally, receive antenna elements 34 may not be arranged in rows and columns as depicted in FIG. 3; instead, receive antenna elements 34 may be arranged in another geometric or non-geometric array.

Examples of processing circuitry may include, any one or more of a microprocessor, a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry FIG. 4 is a conceptual block diagram illustrating an example FMCW radar device 11, including associated electronics. FMCW radar device 11 includes an array controller 66, which controls operation of FMCW radar device 11. Array controller 66 is operably coupled to a master radio frequency (RF) source and clock 68. Array controller 66 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. As described above, the term "processor" or "processing circuitry" may generally refer to any of the foregoing logic circuitry, alone or in combination with other logic circuitry, or any other equivalent circuitry. In some examples, FMCW radar device 11 may include a multiprocessor system on chip (MPSoC) processor architecture. Some examples of MPSoC processors provide both massively parallel processing to form multiple receive beams as well as include several reduced instruction set (RISC) or similar processors that can provide post beam forming processing.

Master RF source and clock 68 generates a base RF signal, for example, at a frequency of about 13 GHz for Ku Band and other frequencies for other bands of operation. In some examples, master RF source and clock 68 may include a fractional N synthesizer. Master RF source and clock 68 is operably coupled to a power amplifier 70, which amplifies the base RF signal and outputs the amplified base RF signal to a power divider 64. Power amplifier 70 may amplify the base RF signal to overcome reduction in power as the base RF signal is divided for use in each receive signal and transmit signal. Power divider 64 is operably coupled to a first corporate feed 62, which is associated with a transmit array 18 (FIG. 3) and a second corporate feed 72, which is associated with a receive array 20 (FIG. 3).

Transmit electronics 52 indicates electronics (e.g., power amplifier 54, image reject mixer (IRM) 56, direct digital synthesizer (DDS)-I 58, and DDS-Q 60) conceptually associated with a single transmit antenna element 24, as shown in FIG. 3. In some examples a DDS may provide 32-bit phase control for accurate beam steering. FIG. 4 illustrates conceptually the components present for a transmit signal being sent to a single transmit antenna element 24. As described with respect to FIGS. 3 and 9, FMCW radar device 11 may include a plurality of transmit antenna elements 24. FMCW radar device 11 thus may include a plurality of transmit antenna elements 24 and a plurality of transmit electronics 52 of FIG. 4. As depicted in the example of FIG. 3, the plurality of transmit elements 24 are components of transmit array 18, which in turn is a component of FMCW radar array 12.

In some examples, equivalent functionality for a plurality of transmit signals each being sent to a respective transmit antenna element 24 may be embodied in a single physical component. For example, a single power amplifier may include a plurality of channels, and each channel may be connected to a respective transmit antenna element. Hence, when embodied in a physical product, FMCW radar device 11 may include fewer components than those illustrated in FIG. 4, as functions of components may be combined and/or a single component may perform a function described with respect to FIG. 4 for multiple signals being sent to respective transmit antenna elements 24 or receive antenna elements 34.

Figure 4:
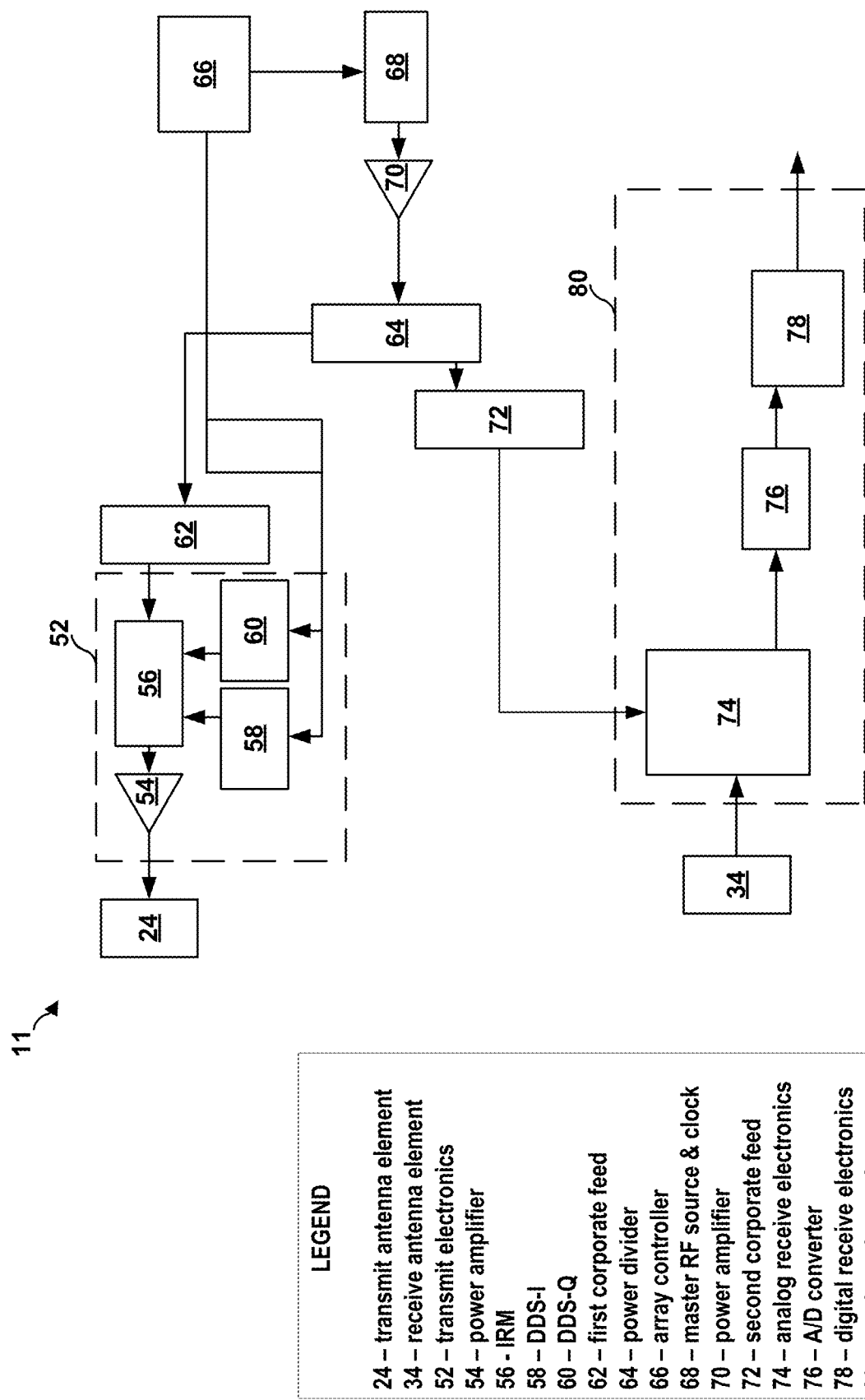
FIG. 4 is a conceptual block diagram illustrating an example FMCW radar device, including associated electronics.

Similarly, though FIG. 4 depicts the transmit electronics and receive electronics as separate components, in some examples, some functions may be combined into a single component. In some examples transmit electronics and receive electronics may each include processing circuitry, as defined above. In other examples, processing circuitry may be external to transmit electronics, or to the receive electronics and the processing circuitry may control the transmit electronics and receive electronics as external components.

Array controller 66 is operably connected to respective inputs of DDS-I 58 and DDS-Q 60, and instructs DDS-I 58 and DDS-Q 60 to generate a phase shift applied to respective intermediate frequency signals. For example, the intermediate frequency may be on the order of tens of megahertz (MHz), such as about 16 MHz, about 32 MHz, or about 64 MHz. DDS-I 58 and DDS-Q 60 output the phase-shifted signals to IRM 56. IRM 56 receives both the phase-shifted signals from DDS-I 58 and DDS-Q 60 and the base RF signal from first corporate feed 62. IRM 56 combines the base RF signal and the phase shifted intermediate frequency signals from DDS-I 58 and DDS-Q 60 to produce two phase shifted RF signals, which have frequencies of the base RF signal plus and minus the intermediate frequency, respectively. IRM 56 also attenuates one of the two phase-shifted RF signals and outputs the other of the two phase shifted RF signals to the power amplifier 54. Power amplifier 54 amplifies the phase shifted RF signal and outputs the signal to transmit antenna element 24.

As described above, the transmit beam generated by transmit antenna element 24 and the other transmit antenna elements 24 in the transmit array 18 (FIGS. 3 and 8) may be electronically steered by applying a phase shift to the RF signal output by the transmit antenna elements 24, where the phase shift changes as a function of time. As shown in FIG. 4, the phase shift is generated by DDS-I 58 and DDS-Q 60 under control of array controller 66. Array controller 66 may linearly change the phase shift generated by DDS-I 58 and DDS-Q 60 to linearly scan the transmit beam 42 (FIGS. 1A-2) in azimuth.

Because the phase shift is generated at intermediate frequency rather than RF, the phase shift operation may be more efficient, and thus may utilize smaller power amplifiers 54 compared to when the phase shift is implemented at RF. DDS-I 58 and DDS-Q 60 also may provide linear frequency modulation. In some examples, the phase shift applied by DDS-I 58 and DDS-Q 60 may be changed at most once per frequency modulation period. In some examples, to cause the transmit beam to dwell at a particular position, DDS-I 58 and DDS-Q may change the phase shift less often, e.g., after multiple frequency modulation periods having a given phase shift.

Turning now to the receive portion of FMCW radar device 11, each of receive antenna elements 34 is coupled to an analog receive electronics 74. FIG. 4 illustrates conceptually the components present for a receive signal being received by a single receive antenna element 24. As described with respect to FIG. 3, FMCW radar device 11 may include a plurality of receive antenna elements 34. Although a single receive antenna element 34 and a single analog receive electronics 74 are depicted in the example of FIG. 4, in implementation, receive array 20 includes a plurality of receive antenna elements 34 (FIG. 3). FMCW radar device 11 thus may include a plurality of receive antenna elements 34 and a plurality of analog receive electronics 74 or a single analog receive electronics configured to perform the operations described with respect to analog receive electronics 74 on each of a plurality of receive signals.

However, in some examples, equivalent functionality for a plurality of receive signals each being sent to a respective receive antenna element 34 may be embodied in a single physical component. Hence, when embodied in a physical product, FMCW radar device 11 may include fewer components than those illustrated in FIG. 4, as functions of components may be combined and/or a single component may perform a function described with respect to FIG. 4 for multiple signals being sent to respective receive antenna elements 34.

Analog receive electronics 74 receives the receive signal from receive antenna elements 34 and also receives a base band signal from a second corporate feed 72. Receive electronics 74 combines the receive signal and the base band signal and outputs the combined signal to I and Q analog to digital converter 76 (A/D converter 76). In some examples, an analog to digital converter may be referred to as an A/D converter.

Figure 5:
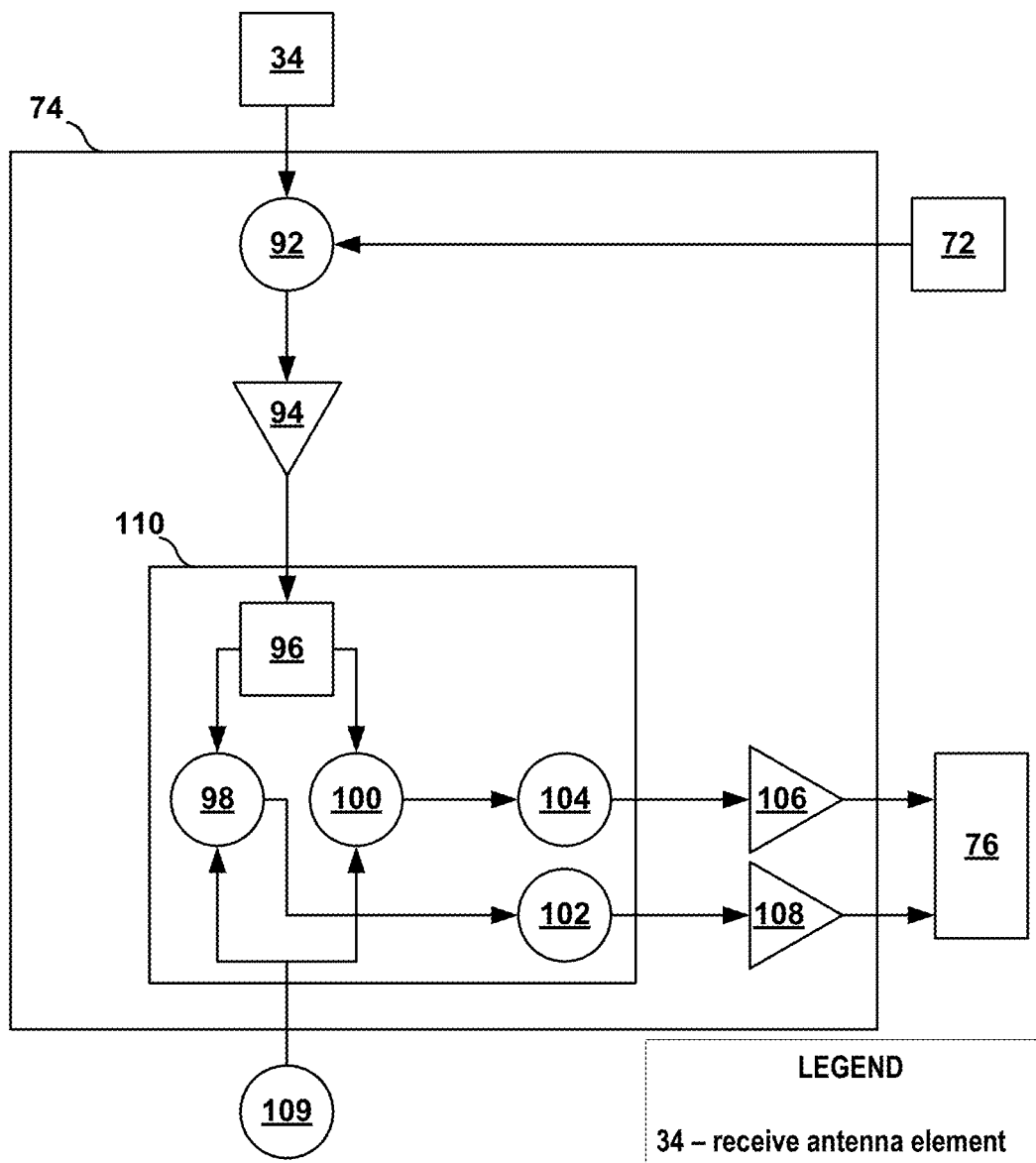
FIG. 5 is a conceptual block diagram illustrating an example receive antenna element and an example of analog receive electronics.

FIG. 5 is a conceptual block diagram illustrating an example receive antenna element 34 and an example of analog receive electronics 74. Receive antenna element 34 in the example of FIG. 5 is like receive antenna element 34 depicted in FIGS. 3 and 4. In the example illustrated in FIG. 5, analog receive electronics 74 includes a receiver mixer 92, a low noise amplifier (LNA) 94, a demodulator and phase shifter 110, I summing operational amplifier 106, and Q summing operational amplifier 108. For simplicity, this disclosure may refer to demodulator and phase shifter 110 simply as demodulator 110 and may refer to I summing operational amplifier 106 and Q summing operational amplifier 108 as operational amplifiers 106 and 108. Receiver mixer 92 is operably coupled to receive antenna element 34 and receives a signal directly from receive antenna element 34, with no intervening amplifiers. Intervening amplifiers between receive antenna element 34 and receiver mixer 92 may raise the noise floor of the receiver, due to use of FMCW radar and simultaneous transmit and receive. Receiver mixer 92 also receives a signal from second corporate feed 72, which is at the RF frequency (e.g., about 13 GHz). Because the RF signal output by DDS-I 58 and DDS-Q 60 (FIG. 4) is offset from the RF frequency by the intermediate frequency (e.g., 16 MHz, 32 MHz, or 64 MHz), the signal received by receiver mixer 92 from receive antenna element 34 is offset from the RF frequency signal from second corporate feed 72 by the intermediate frequency. Hence, the signal output from receiver mixer 92 has a frequency of the intermediate frequency (e.g., 16 MHz, 32 MHz, or 64 MHz). The FMCW radar systems described herein thus may be heterodyne FMCW radar systems, and the intermediate frequency at which the receive signals are operated on (for at least part of the analog receive electronics 74) are created by heterodyning the signal received from receive antenna element 34 and the RF frequency signal from second corporate feed 72.

Receiver mixer 92 is operably coupled to a LNA 94, which amplifies the intermediate frequency signal received from receiver mixer 92 and outputs the amplified signal to demodulator 110. Demodulator 110 splits the receive signal into I and Q components at block 96 and sends the Q and I signals to mixers 98 and 100, respectively. In the example of FIG. 5, block 96 is a 90-degree hybrid power divider. At first mixer 98, the Q signal is down-converted to base band (e.g., between about 0 MHz and about 2 MHz) by combining the Q signal with a reference clock signal 109, which is derived from the second corporate feed 72 signal and may have a frequency that is an integer multiple of the intermediate frequency. At second mixer 100, the I signal is down-converted to base band (e.g., between about 0 MHz and about 2 MHz) by combining the I signal with reference clock signal 109. First mixer 98 is operatively coupled to a first phase shifter 102, which shifts the phase of the Q signal to steer the receive beams in azimuth. Second mixer 100 is operatively coupled to a second phase shifter 104, which shifts the phase of the I signal to steer the receive beams in azimuth.

Figure 8:
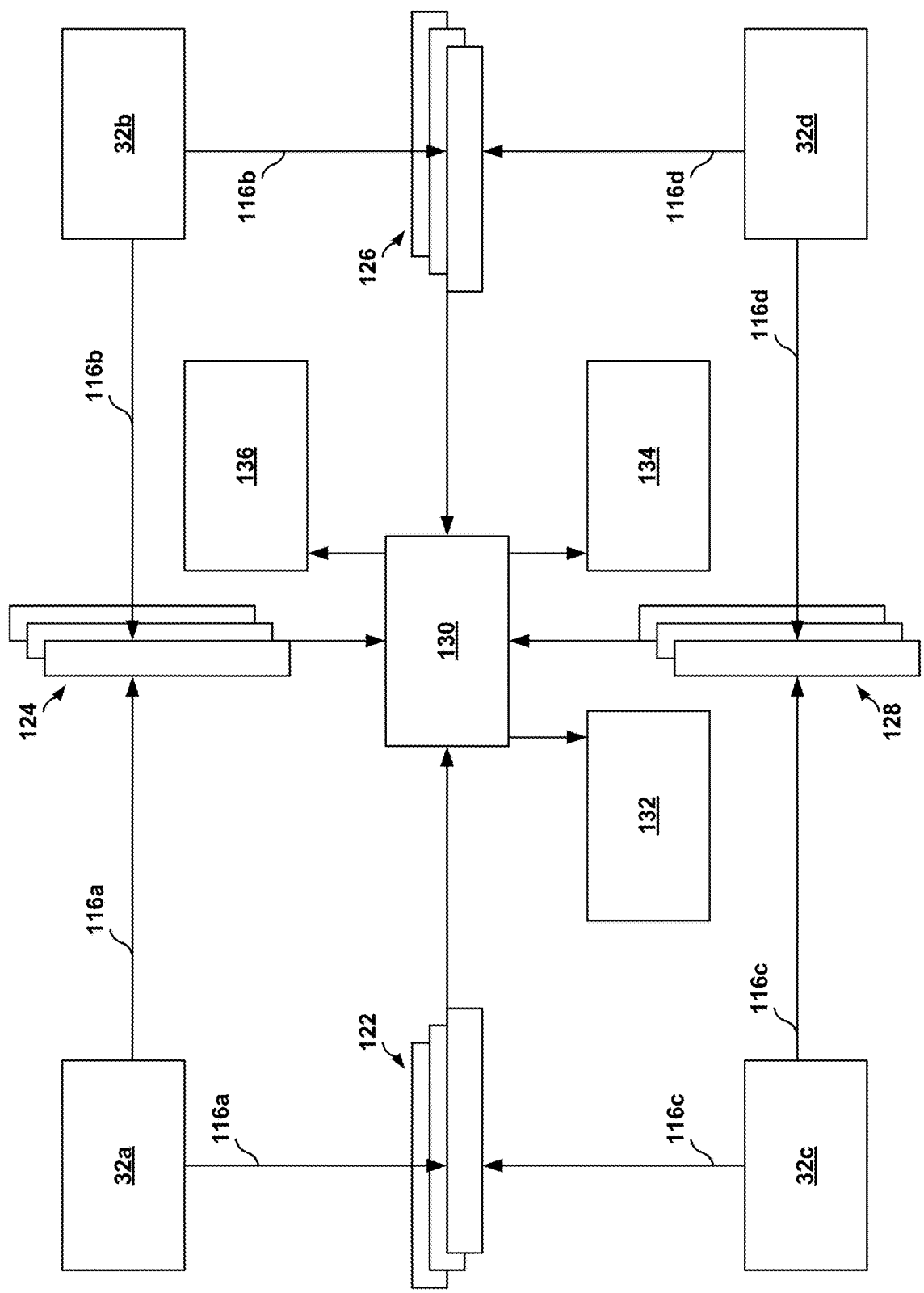
FIG. 8 is a functional block diagram illustrating example functions for producing a plurality of receive beams from signals received from a respective receive electronics for each quadrant of a receive array.

As shown in FIG. 5, the phase-shifted I signal and the phase-shifter Q signal are output to respective summing operational amplifiers 106 and 108 (e.g., active filter summing operational amplifiers 106 and 108). Although not shown in FIG. 5 (see FIG. 6), first summing operation amplifier 106 may receive phase-shifted I signals corresponding to all receive antenna elements 34 in a row of one of quadrants 32 (FIGS. 3 and 8). For each row in each of quadrants 32, a first summing operation amplifier 106 sums the I signals for the respective receive antenna elements 34 in the row of the quadrant. Similarly, second summing operation amplifier 108 may receive phase-shifted Q signals corresponding to all receive antenna elements 34 in a row of one of quadrants 32 (FIGS. 3 and 8). For each row in each of quadrants, a second summing operation amplifier 108 sums the Q signals for the respective receive antenna elements 34 in the row of the quadrant. The summing operation amplifiers 106 and 108 output the summed I and Q signals for each row elements 34 of each of quadrants 32 to A/D converter 76. In some examples, in addition to summing the I and Q signals, respectively, summing operation amplifiers 106 and 108 may apply a high pass filter, a low pass filter, or both, to shape the I and Q signals. The gain slopes for the optional high pass filter may be selected based on the application of the FMCW radar system. As examples, for weather detection, the high pass filter slope may be about 20 dB per octave; for ground imaging, the high pass filter slope may be about 30 dB per octave; for airborne target detection, the high pass filter slope may be about 40 dB per octave; or the like. In some examples, the high pass filter compensates for propagation losses in space and the low pass filter acts as an anti-alias filter.

Figure 6:
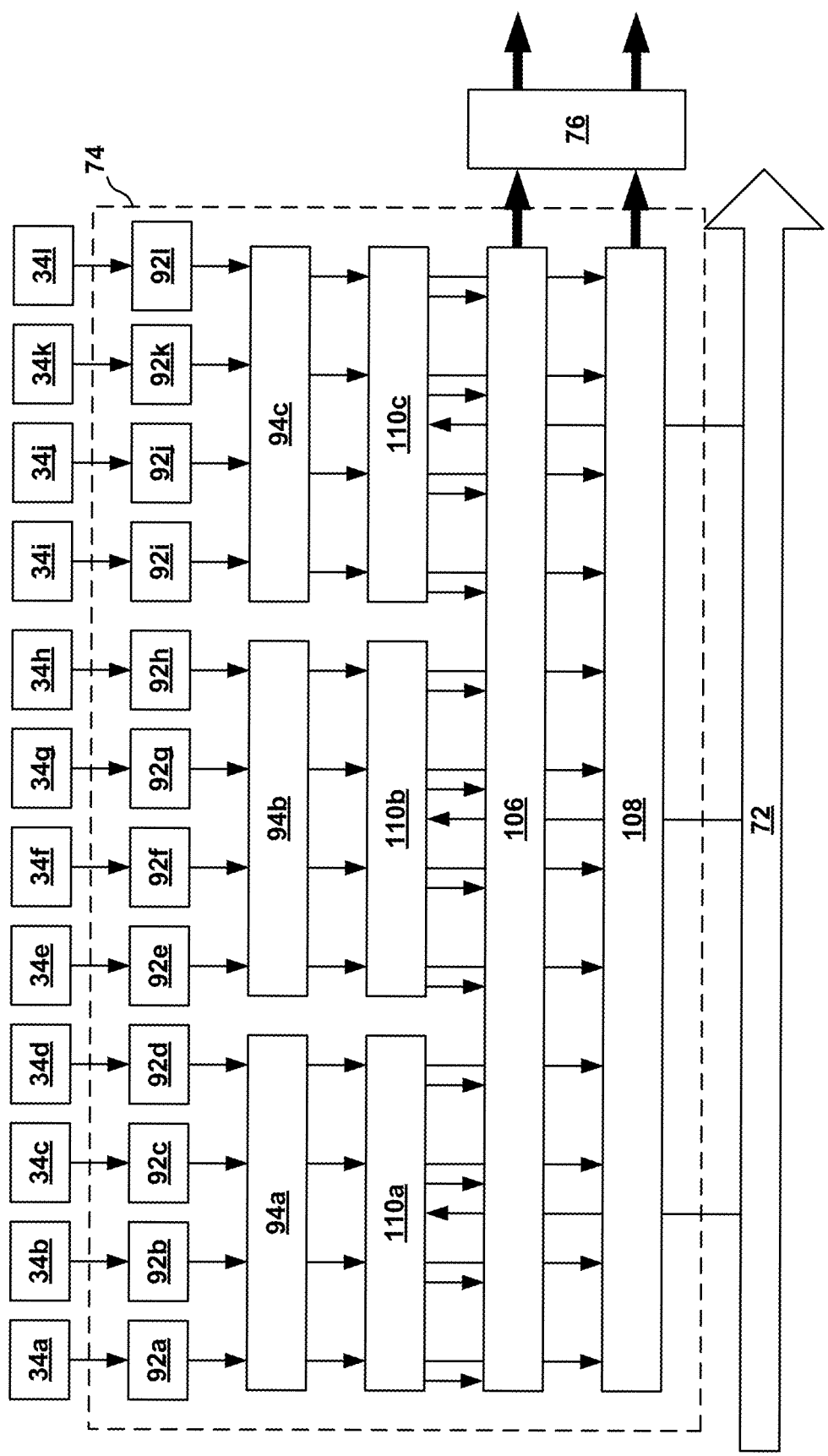
FIG. 6 illustrates another example conceptual block diagram of an analog receive electronics portion for a row of a receive array.

FIG. 6 illustrates another example conceptual block diagram of an analog receive electronics portion for a row of a receive array 20. As shown in FIG. 6, a row of receive array 20, with quadrants 32a-32d (FIGS. 3 and 8) includes a plurality of receive antenna elements 34a-34l (collectively, "receive antenna elements 34"). Although twelve receive antenna elements 34 are illustrated in FIG. 6, in other examples, a row of a receive array 20 may include more or fewer receive antenna elements 34. In general, a row of receive array 20 may include a plurality of receive antenna elements.

Each of receive antenna elements 34 is operably connected to a respective receiver mixer of the plurality of receiver mixers 92a-92l (collectively, "receiver mixers 92"). As described with respect to FIG. 6, each of receiver mixers 92 may also receive an RF signal from second corporate feed 72, although this is not shown in FIG. 6. Although twelve receiver mixers 92 are illustrated in FIG. 6, in other examples, analog receive electronics 74 may include more or fewer receiver mixers 92. In some examples, analog receive electronics 74 may include a respective receiver mixer 92 for each receive antenna element of receive antenna elements 34. Each of receiver mixers 92 is operably connected to a respective channel of one of LNAs 94a-94c (collectively, "LNAs 94"). For example, receive electronics 74 may be a quad (4×) device with four sets of elements. In other words, a quad device may include four LNAs 94, four demodulators 110 and sixteen receiver mixers 92.

LNAs 94 amplify the receive signal and are operably coupled to a respective channel of one of demodulators 110a-110c (collectively, "demodulators 110"). Similar to FIG. 5, demodulators 110 in FIG. 6 may also include phase shift function. Although three LNAs 94 each with four channels are illustrated in FIG. 6, in other examples, each of LNAs 94 may include more or fewer channels, and there may be more or fewer LNAs 94 for a row of receive antenna elements 34. Similarly, although three demodulators 110 each with four channels are illustrated in FIG. 6, in other examples, each of demodulators 110 may include more or fewer channels, and there may be more or fewer demodulators 110 for a row of receive antenna elements 34. As described above in relation to FIG. 5, quadrature mixers 110 may down-convert the receive signal to base band, separate the receive signal into I and Q components, apply a phase shift to the I and Q components, and output the phase-shifted I and Q signals. An example of demodulator 110 may include the AD8339 demodulator and phase shifter from Analog Devices.

As shown in FIG. 6, quadrature mixers 110 may output the phase-shifted I signals to a first summing operational amplifier 106, which sums all the phase-shifted I signals to yield a summed I signal for the row. Similarly, quadrature mixers 110 may output the phase-shifted Q signals to a second summing operational amplifier 108, which sums all the phase-shifted Q signals to yield a summed Q signal for the row. First summing operation amplifier 106 outputs the summed I signal to/A/D converter 76, and second summing operation amplifier 108 outputs the summed Q signal to analog-to-digital converter 76. Receive array 20 may include components that perform substantially similar functions for each row of receive antenna elements 34 in each quadrant 32 of the receive array 20.

Referring to FIG. 4, analog-to-digital converter 76 outputs the digital data streams for the summed I and Q values to a digital receive electronics 78. Digital receive electronics 78 may be configured to generate a plurality of receive beams from the digital data streams for the summed I and Q values received from A/D converter 76.

Radar system 10 may control the receive beam width by electronically turning off or ignoring the input from any receive antenna element 34 in a row. Though a receive antenna element, such as receive antenna element 34a, may still receive the return receive signal, radar system 10 may not include the output from receive antenna element 34a during signal processing, in some examples. Controlling the beam width may provide guard channel to reject azimuth sidelobes and reject ground clutter detected in these sidelobes.

In some examples, each row is uniformly illuminated and produces first sidelobes, which may be compensated initially, such as by applying the Taylor Taper to the transmit array for low sidelobe illumination. Each receive row may be amplitude weighted to achieve any desired elevation beamwidth greater than the lowest possible beamwidth by applying appropriate complex weights to the row outputs. This may provide a guard channel to reject elevation sidelobes and reject ground clutter detected in these sidelobes. This guard channel may be computed in parallel with the full gain and minimum beamwidth of the full receive array. In some examples, the receive array may be steered in elevation using complex weights, which may be applied in the MPSoC processor. The MPSoC processor may divide the receive array into two or more sub-apertures that may be used to provide elevation monopulse angle measurement or other functions.

Figure 7:
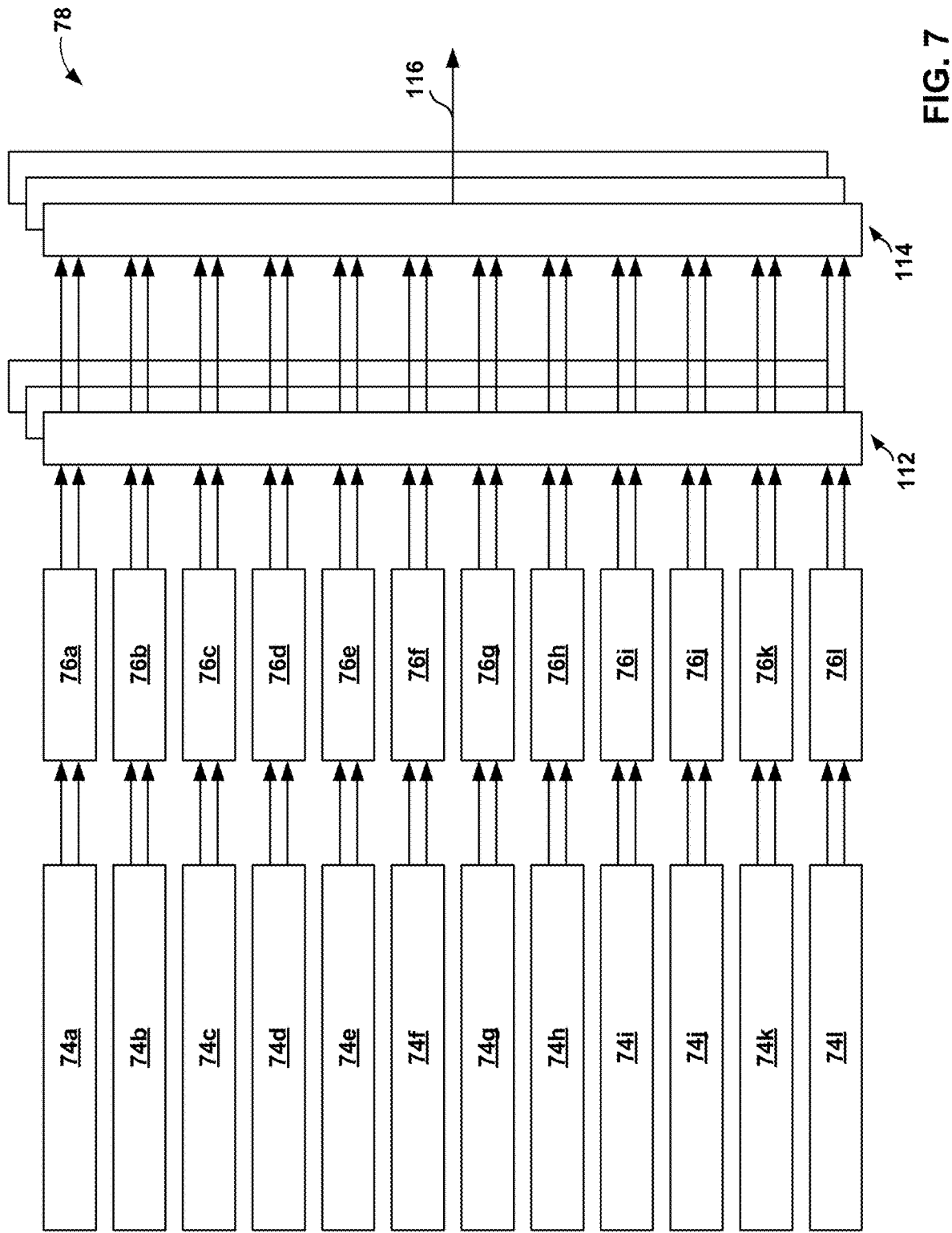
FIG. 7 is a functional block diagram illustrating example functions of analog to digital converters and portions of a digital receive electronics for a quadrant of a receive array.

FIGS. 7 and 8 illustrate example aspects of an example digital receive electronics 78 as described above in relation to FIG. 4. FIG. 7 is a functional block diagram illustrating example functions of A/D converters 76a-76l (collectively A/D converters 76) and portions of a digital receive electronics 78 for a quadrant 32 of a receive array 20, as depicted in FIGS. 3 and 9. FIG. 8 is a functional block diagram illustrating example functions for producing a plurality of receive beams from signals received from a respective receive electronics 74 for each quadrant 32 of a receive array 20.

As shown in FIG. 7, a plurality of analog receive electronics 74a-74l each outputs a respective summed I signal and a respective summed Q signal to a respective one of A/D converters 76. In the example of FIG. 7, twelve analog receive electronics 74 and twelve A/D converters 76 are depicted. However, in other examples, a quadrant 32 may include more or fewer rows of receive antenna elements 34, and may accordingly include more or fewer analog receive electronics 74. In some examples, a receive array 20 includes an analog receive electronics 74 for each row of each of quadrants 32. Similarly, a receive array 20 may include more or fewer A/D converters, and the number of analog-to-digital converters for a quadrant 32 may be the same as or different than the number of rows of receive antenna elements 34 in the quadrant 32.

Each of the A/D 76 converts an analog summed I signal to a digital I data stream and an analog summed Q signal to a digital Q data stream. Digital receive electronics 78 then may apply a complex beam weight 112 to the digital I data streams and digital Q data streams and sum 114 the results to generate a weighted I data stream and a weighted Q data stream 116 for the quadrant. The complex beam weight may be selected to result in weighted I and Q data streams 116 being generated that can be used by digital receive electronics 78 to generate a receive beam at a predetermined elevation position, as described with reference to FIGS. 2 and 6. The number of complex beam weights 112 may be the same as the number of receive beam positions.

In some examples, digital receive electronics 78 may reuse the digital I data streams and the digital Q data streams by applying a different complex beam weight 112 to the digital I signals and the digital Q data streams to generate each of a plurality of weighted I and Q data streams 116. Each of the plurality of complex beam weights 112 may be selected to result in a respective weighted I and Q data stream being generated that is used to form a receive beam at a predetermined elevation position. The complex beam weights 112 may apply both amplitude taper and elevation beam steering to the digital I data streams and the digital Q data streams. The result of the applying the complex beam weights 112 is a plurality of weighted I data streams and a plurality of weighted Q data streams 116, one weighted I data stream and one weighted Q data stream 116 for each of the complex beam weights 112. Hence, each of quadrants 32 forms a plurality of weighted I data streams and a plurality of weighted Q data streams 116, one data stream in I and Q for each of the receive beam positions. To facilitate formation of the monopulse tracking beams, the number of weighted I data streams and weighted Q data streams 116 output by each of quadrants 32 may be the same.

As shown in FIG. 8, the output weighted I data streams and weighted Q data streams 116 are used by the digital receive electronics 78 (FIG. 4) to form monopulse tracking beams at each receive beam position. As shown in FIG. 8, each of quadrants 32 outputs a respective plurality of weighted I data streams and plurality of weighted Q data streams 116a-116d (collectively, "plurality of weighted I data streams and plurality of weighted Q data streams 116"). The number of weighted I data streams and the number of weighted Q data streams 116 for each of quadrants 32 corresponds to the number of receive beam positions.

Digital receive electronics 78 sums the first weighted I data stream from the first quadrant 32a and the first weighted I data stream from second quadrant 32b (the top two quadrants) to form a first top I data stream. Each of the first weighted I data streams may correspond to the same (a first) receive beam position. Similarly, digital receive electronics 78 sums the first weighted Q data stream from the first quadrant 32a and the first weighted Q data stream from second quadrant 32b to form a first top Q data stream. Each of the first weighted Q data streams may correspond to the same (the first) receive beam position. Digital receive electronics 78 repeats this summation for each of the plurality of weighted I data streams and each of plurality of weighted Q data streams 116a from first quadrant 32a and each of the plurality of weighted I data streams and each of plurality of weighted Q data streams 116b from second quadrant 32b. This results in a plurality of top I data streams and a plurality of top Q data streams 124, with the number of top I data streams and the number of top Q data streams 124 corresponding to the number of receive beam positions. As described in relation to FIG. 6, some examples may include more or fewer data streams than the three depicted in FIG. 8.

Similarly, digital receive electronics 78 sums the first weighted I data stream from the first quadrant 32a and the first weighted I data stream from third quadrant 32c (the left two quadrants) to form a first left I data stream. Each of the first weighted I data streams may correspond to the same (a first) receive beam position. Similarly, digital receive electronics 78 sums the first weighted Q data stream from the first quadrant 32a and the first weighted Q data stream from third quadrant 32c to form a first left Q data stream. Each of the first weighted Q data streams may correspond to the same (the first) receive beam position. Digital receive electronics 78 repeats this summation for each of the plurality of weighted I data streams and each of plurality of weighted Q data streams 116a from first quadrant 32a and each of the plurality of weighted I data streams and each of plurality of weighted Q data streams 116c from third quadrant 32c. This results in a plurality of left I data streams and a plurality of left Q data streams 122, with the number of left I data streams and the number of left Q data streams 122 corresponding to the number of receive beam positions.

Digital receive electronics 78 performs this process for each for each of the plurality of weighted I data streams and each of plurality of weighted Q data streams 116c from third quadrant 32c and each of the plurality of weighted I data streams and each of plurality of weighted Q data streams 116d from fourth quadrant 32d to form a plurality of bottom I data streams and a plurality of bottom Q data streams 128. Digital receive electronics 78 also performs this process for each for each of the plurality of weighted I data streams and each of plurality of weighted Q data streams 116b from second quadrant 32b and each of the plurality of weighted I data streams and each of plurality of weighted Q data streams 116d from fourth quadrant 32d to form a plurality of right I data streams and a plurality of right Q data streams 126.

Digital receive electronics 78 performs monopulse arithmetic 130 using the plurality of I and Q data streams 122, 124, 126, and 128 to form a monopulse sum beam, a monopulse azimuth delta beam, and a monopulse elevation delta beam for each of the receive beam positions. For example, by summing each of the first I data streams and each of the first Q data streams, digital receive electronics 78 may form a monopulse sum beam for the first receive beam position. By subtracting the first right I and Q data streams from the first left I and Q data streams, digital receive electronics 78 may form a monopulse azimuth delta beam for the first receive beam position. By subtracting the first bottom I and Q data streams from the first top I and Q data streams, digital receive electronics 78 may form a monopulse elevation delta beam for the first receive beam position. Digital receive electronics 78 may perform similar calculations to form a monopulse sum beam, a monopulse azimuth delta beam, and a monopulse elevation delta beam at each receive beam position using respective ones of the plurality of left, top, right, and bottom I and Q data streams 122, 124, 126, and 128.

After digital receive electronics 78 has formed each of the plurality of monopulse sum beams, each of the plurality of monopulse azimuth delta beams, and each of the plurality of monopulse elevation delta beams (one of each beam for each receive beam position), digital receive electronics 78 applies a Fast Fourier Transform (FFT) to each respective beam to transform the beam from the frequency domain to the range domain. In some examples, the FFT generates 2048 FFT bins, each bin corresponding to a range bin of about 24 feet (about 8 meters). In some examples, an FMCW radar device, in accordance with the techniques of this disclosure may form up to 36 simultaneous receive beams, where some receive beams are monopulse beams. The monopulse beams may allow monopulse beam tracking of objects in the predetermined area 48 (FIG. 2).

In some examples, the receive electronics 80 (FIG. 4), which may include analog receive electronics 74, A/D 76, and digital receive electronics 78, may steer the receive beams in azimuth by applying a phase shift to the receive signals from each of receive antenna elements 34 using analog receive electronics 74. Analog receive electronics 74 may sequentially apply different phase shifts to the receive signals from each of receive antenna elements 34 to steer the receive beams in azimuth. At each azimuth position, digital receive electronics 78 may generate the plurality of receive beams (including monopulse sum, azimuth delta, and elevation delta beams at each receive beam position). In some examples, the elevation position of each of the receive beams may not change as the receive beams are scanned in azimuth. In other words, in some examples, digital receive electronics 78 applies the same set of complex beam weights to the I digital steams and Q digital streams at least of the azimuth positions. The output of the digital receive electronics 78 may be used by the radar system for target selection and tracking.

By performing most manipulations of the receive signals at baseband frequencies rather than RF and summing the I and Q signals for each row in a quadrant before digitally forming the plurality of receive beams, component count may be reduced and power efficiency may be increased. Additionally or alternatively, less complex and/or inefficient phase shifters may be used compared to when phase shifting is performed at RF. In some examples, this may reduce or substantially eliminate receiver losses and may not utilize receiver amplifiers with their attendant power dissipation, circuit board space, and cost. In some examples, receive array 20 does include a respective low noise amplifier (LNA) between a respective receive antenna element 34 and a respective receiver mixer 92. If present between the respective receive antenna element 34 and the respective receiver mixer 92, the LNA may reduce transmit array-to-receive array isolation and the LNA may be saturated by nearby transmit array leakage power. By avoiding LNAs at every receive antenna element, the parts count of receive array 20 may be reduced, which may improve cost, power dissipation, and/or reliability of receive array 20. Additionally, the formation of multiple receive beams and monopulse tracking beams at each receive beam position may facilitate object tracking by the radar system.

In operation, the receive signals from each element and row may be stored as a data set and reused for several different modes. In other words, the same receive signal at a particular row or element received at first time may be stored as a data set. The stored data set may be combined with other data sets from other rows received at the same or a different time to perform a variety of different analyses in a variety of modes. All modes may be used individually or in combination with any other mode or set of modes according to flight phase of aircraft 2, or the operation of another type of vehicle. Modes may be interleaved to provide the greatest benefit to the vehicle operator. Modes may be used with "Chaotic Beam Steering," e.g. non-linear or random scans as required to achieve the functions of each mode. Some example modes as well as features and advantages of modes are listed in the table below.

TABLE 1

Examples Radar Modes

| Mode | Example features |
| --- | --- |
| Standard Weather Radar Mode | 3 Seconds, >90 Degrees AZ |
| | Weather Detection to 320 NMi |
| | Turbulence Detection to >=40 Nmi |
| | Lightning Detection Inference |
| Terrain Avoidance and Terrain Following Mode | Uses multiple beams to track terrain level |
| | Helicopter Application |
| | Provide Ground Collision Warning in GPS Denied Conditions or prevent collisions with new obstacles not in the EGPWS database |
| | Can alert need to update the database |
| Enhanced Weather Mode | Improved HAIC Detection |
| | Potential Volcanic Eruption and Ash Detection |
| | Enhanced Storm Cell Detail and Cell growth or decay |
| Navigation Mode | Runway Detection, Runway Approach Lights, Runway Intrusion detection |
| | Runway alignment, glide slope measurement enhanced with Monopulse Angle measurement |
| Taxi Collision Avoidance Mode | Taxi in CAT III conditions to avoid all moving or stationary obstacles |
| UAV Collision Avoidance Mode | On approach or take off |
| Bird Flock Detection Mode | On approach or take off |
| Approach Mode | Runway detection |
| | Intrusion Detection |
| | PWS Detection |
| | Weather Detection |
| Enhanced PWS Mode | Sidelobe Clutter Rejection via Guard Beam |
| | False PWS alert prevention without runway database |
| Electronic Beam Pointing Stabilization | Accelerometers on DAPA provide motion feedback to processor |
| Synthetic Vision Mode | Fine Range resolution images enhanced with |

TABLE 1-continued

Examples Radar Modes

| Mode | Example features |
|---|---|
| Waveform Flexibility | monopulse angle measurement<br>DAPA provides any desired sequence of Linear FM, Fixed Frequency CW or Stepped Frequency CW<br>DAPA provides any combination of Linear FM slopes (+/−/0)<br>DAPA allows beam pointing to be updated every waveform or after multiple waveforms have been transmitted |
| FMCW Mode | Allows fine range resolution and short range detection capability<br>Allows the potential for SVS enhancements |

Figure 9:
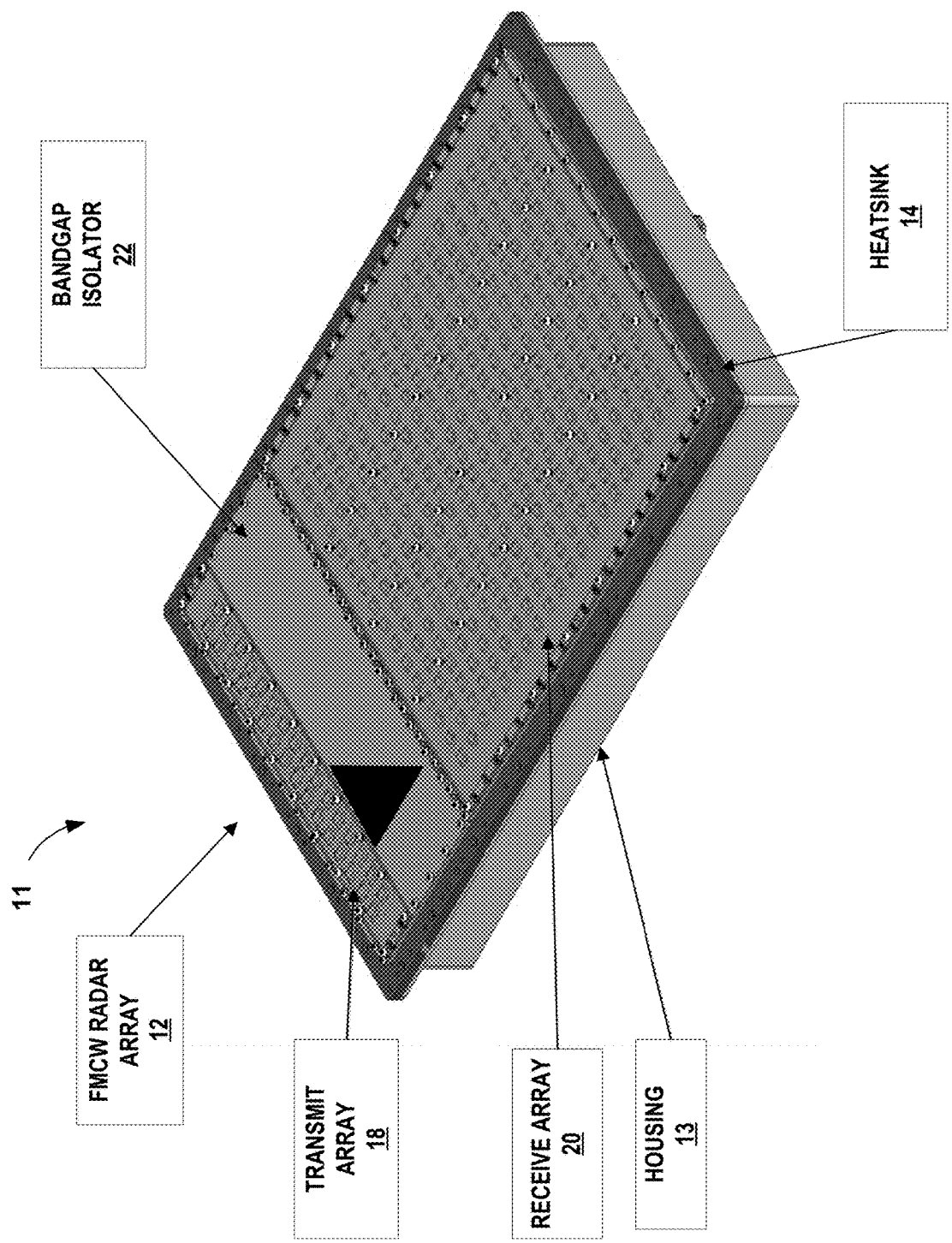
FIG. 9 is a conceptual diagram illustrating an example FMCW radar device.

FIG. 9 is a conceptual diagram illustrating an example FMCW radar device 11. In some examples, FMCW radar device 11 may include a plurality of printed circuit boards disposed substantially parallel to each other and to the front surface of FMCW radar device 11. In some examples, the top layer printed board may be referred to as a patch layer, and may include antenna elements, such as transmit array 18, EBG isolator 22 and receive array 20 and radio frequency components. Transmit array 18, receive array 20 and EBG isolator 22 may be similar or the same as FMCW radar array 12 depicted in FIG. 3. EBG isolator 22 disposed between the transmit antenna and the receive antenna as shown in FIG. 3. In some examples, EBG isolator 22 may be printed array of resonant patch elements having dimensions selected to provide cancelation of electromagnetic radiation from the frequency modulated continuous wave transmit beam to reduce a magnitude of radiation from the transmit array to which the receive array is indirectly exposed. In other words, EBG isolator 22 may isolate transmit array 18 from receive array 20. The components of FMCW radar device 11 may be a single, integrated package.

In some examples, other printed boards (not shown in FIG. 9) may include digital and frequency synthesizer components, including devices, such as field programmable gate arrays (FPGAs) that control scanning and beamforming on receive. Some additional printed circuit boards may include power supply components and additional signal processing components, along with an interface for connecting FMCW radar device 11 to other FMCW radar arrays and/or components of the aircraft or device on which FMCW radar device 11 is utilized. In some examples, multiple FMCW radar arrays may be connected to common control electronics, which may control operation of the FMCW radar arrays, including, for example, radar pulse synchronization, scanning frequencies, target tracking, or the like.

The printed circuit boards, transmit array 18 and receive array 20 are physically proximate to each other, e.g., located in a single housing 13. For example, the patch layer, heatsink 14 and the cover may be considered a housing, similar or the same as housing. The printed circuit boards, including the patch layer may include the components described in relation to FIGS. 4-8 for an FMCW radar device and located in single housing.

In some examples, a proposed system is a continuous wave (transmits 100% of the time) at 30 W and uses a total input power for three faces of about 550 W. The top transmit element rows use transmitter parts, while the remaining receive element rows use receive only parts. This may reduce costs by reducing the number of high cost transmit components.

Figure 10:
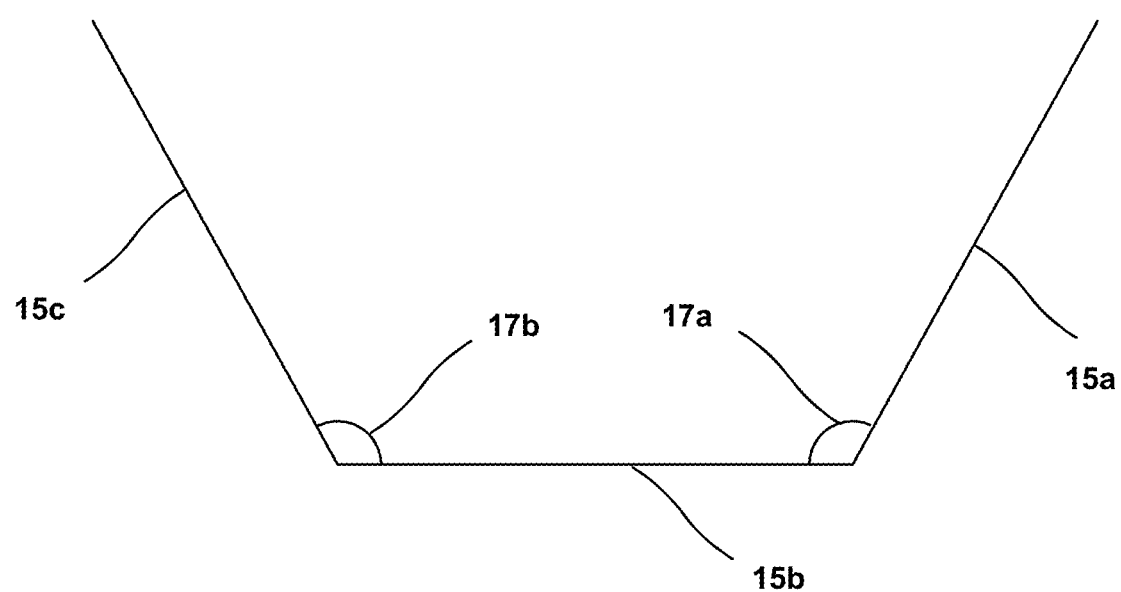
FIG. 10 is a simplified conceptual diagram illustrating array surfaces of an example arrangement of a plurality of FMCW radar devices.

FIG. 10 is a simplified conceptual diagram illustrating array surfaces of an example arrangement of a plurality of FMCW radar devices. The array surfaces 15a-15c (collectively, "array surfaces 15") may be mechanically attached or coupled to supports of a frame. The frame may be shaped to position FMCW radar devices 11 relative to each other. As shown in FIG. 10, the three array surfaces 15 are disposed at angles with respect to each other. Interior angles 17a and 17b may be defined between the first array surface 15a and second array surface 15b, and between the second array surface 15b and third array surface 15c. In some examples, interior angles 17a and 17b may be the same. In other examples, interior angles 17a and 17b may be the same. Interior angles 17a and 17b may be between about 90° and about 180°. In some examples, one or both of interior angles 17a and 17b may be about 120°.

By arranging FMCW radar devices 11 at angles with respect to each other in, the transmit array/receive array pairs (e.g., first transmit array 18a and first receive array 20a, second transmit array 18b and second receive array 20b, and third transmit array 18c and third receive array 20c) are disposed at angles with respect to each other. This may allow radar system 10 to monitor a greater range in azimuth more efficiently than using only a single transmit array/receive array pair. For example, each transmit array/receive array pair may be configured to scan a predetermined window with a predetermined extent in azimuth and elevation. In some examples, the predetermined extent in azimuth may be about ±40° from the plane orthogonal to the face of the transmit array/receive array pair or about ±38° in azimuth. As the three transmit array/receive array pairs are disposed at angles with respect to each other and the predetermined window for each transmit array/receive array pair may overlap with the predetermined window for the adjacent transmit array/receive array pair(s), radar system 10 may allow a total azimuth scan area of between about 220° and about 228° in some examples. The total azimuth scan area may depend at least in part on an overlap in azimuth between scan areas of the three FMCW radar devices 11.

As described above, a radar system, such as radar system 10, may have two FMCW radar devices arranged at an angle with respect to each other. In some examples the two FMCW radar devices may cover a field of regard (FOR) in azimuth more than 100 degrees. In the example of FIG. 10 where interior angles 17a and 17b each equal approximately 120 degrees, radar system 10 may cover a FOR in where the maximum and minimum of the azimuth range covers more than 200 degrees. In still other examples, a radar system, such as radar system 10, may include four or more FMCW radar devices 11. In some examples, such a radar system may cover a larger azimuth up to 360 degrees. In other examples, a radar system with four or more FMCW radar devices may cover the same azimuth as a two or three device radar system. However, the additional FMCW radar devices may give the radar system additional functionality. For example, the additional FMCW radar devices may provide additional monopulse beams for faster or more accurate object tracking, while performing other functions described above, such as PWS analysis to predict possible wind shear events. Similarly, each FMCW radar device includes additional signal processing circuitry. Radar system 10 may use the additional processing capacity to perform additional functions.

FIG. 11 is a flow diagram illustrating an example operation of a multi-function electronically steered weather radar. The steps depicted in FIG. 11 will be described in relation to FIGS. 2-4.

The multi-function electronically steered weather radar, such as FMCW device 11, may electronically steer a transmit beam 42 by controlling a transmit array 18, which includes a plurality of transmit antenna elements 24 to output a frequency modulated continuous wave (FMCW) transmit beam (200). The plurality of transmit antenna elements 24 may be arranged such that a number of transmit antenna elements in a first transmit array dimension is greater than a number of transmit antenna elements in a second transmit array dimension substantially perpendicular to the first transmit array dimension. The FMCW transmit beam 42 illuminates an area with a greater extent in a first illumination direction 45 than in a second illumination direction 46 substantially perpendicular to the first illumination direction. The transmit array may be controlled, for example, by array controller 66.

Array controller 66, or some other component of FMCW radar device 11 may control the transmit electronics to electronically scan the FMCW transmit beam 42 in the second illumination direction 46 (202), which is also depicted in FIG. 1A as 46. Beam steering may be controlled by a phase shift implemented by I and Q DDS pairs at each array column of two transmit antenna elements 24.

FMCW radar device 11 may control receive electronics 80 to receive a plurality of receive signals from receive array 20 comprising a plurality of receive antenna elements 34 (204). Receive antenna elements 34 may be arranged in quadrants 32 (see FIGS. 3 and 8).

FMCW radar device 11 may further control receive electronics 80 to electronically generate and scan in the second illumination direction 46 a plurality of receive beams 44 such that the scanning of each receive beam 44 is coordinated with the scanning of the FMCW transmit beam 42. In this manner, the plurality of receive beams 44 are within the area illuminated by the FMCW transmit beam 42 throughout the scanning of the FMCW transmit beam 42 and the plurality of receive beams 44 in the second illumination direction 46 (206). Receive electronics 80 associated with receive array 20 may generate the beams by processing the phase-shifted signals as described above to produce phase-shifted and summed I and Q values for each row of receive antenna elements 34 in each respective quadrant of quadrants 32.

Processing circuitry within FMCW radar device 11, such as an MPSoC described above, may determine one or more characteristics of a sub-area of a plurality of sub-areas of the area illuminated by the FMCW transmit beam 42 (208). The sub-area of the plurality of sub-areas is within a receive beam, e.g. 44D, of the plurality of receive beams 44. Some examples of characteristics may include collision avoidance or navigation characteristics such as range, bearing, speed, tracking and size characteristics of an object such as a UAV or a series of runway lights. Other examples may include reflectivity characteristics of weather within the field of regard of FMCW radar device 11.

In one or more examples, the functions described above may be implemented in hardware, software, firmware, or any combination thereof. For example, the various components of FIG. 4, such as receiver electronics 80 and controller and master RF clock 68 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include RAM, ROM, EEPROM, CD-ROM or other optical disk storage, magnetic disk storage, or other magnetic storage devices, flash memory, or any other medium described further below that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein, such as array controller 66, may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various embodiments of the disclosure have been described. These and other embodiments are within the scope of the following claims.

The invention claimed is:

1. A frequency modulation continuous wave (FMCW) radar device, the device comprising:
   a transmission antenna array comprising a plurality of transmit antenna elements, wherein the transmission antenna array is configured to output an FMCW transmit beam that illuminates an area with a greater extent in a first illumination direction than in a second illumination direction, wherein the second illumination direction is substantially perpendicular to the first illumination direction;
   transmit electronics operable to electronically scan the FMCW transmit beam in the second illumination direction;
   a receive antenna array comprising a plurality of receive antenna elements; wherein the receive antenna array is configured to:
      receive reflected return signals for a given azimuth that arrive at the receive antenna array as phase coherent and amplitude coherent signals, and
      output a plurality of receive signals based on the reflected return signals; and
   receive electronics operable to:
      receive a plurality of receive signals;
      generate, using the plurality of receive signals, a plurality of receive beams within the area illuminated by the FMCW transmit beam and electronically scan each receive beam of the plurality of receive beams in the second illumination direction such that the scanning of each receive beam is coordinated with the scanning of the FMCW transmit beam in the second illumination direction; and
   processing circuitry configured to:
      determine one or more characteristics of a plurality of sub-areas of the area illuminated by the FMCW transmit beam, wherein a sub-area of the plurality of sub-areas is within a receive beam of the plurality of receive beams, wherein the processing circuitry is configured to determine the one or more characteristics based on a selected radar mode for the sub-area; and
      assemble a coherent mapping of reflectivity characteristics in the first illumination direction based on the phase coherent and amplitude coherent signals and from the characteristics of the plurality of sub-areas.

2. The device of claim 1 wherein the sub-area is a first sub-area, and wherein the selected radar mode for the first sub-area is a terrain avoidance mode, wherein the processing circuitry is configured to track terrain level in the field of regard of the device and provide ground collision warnings to the vehicle operator.

3. The device of claim 2, wherein the processing circuitry is further operable to determine the one or more characteristics of the first sub-area of the plurality of sub-areas for the area at substantially a same time as a second sub-area of the plurality of sub-areas for the area illuminated by the FMCW transmit beam.

4. The device of claim 1, wherein the sub-area is a first sub-area, and wherein the selected radar mode for the first sub-area is an approach mode, wherein the processing circuitry is configured to validate navigation to a selected runway during an approach phase of flight to a landing zone.

5. The device of claim 4, wherein the processing circuitry is configured to validate navigation to the selected runway by detecting landing system lighting, runway lighting and taxiway lighting.

6. The device of claim 1, wherein the processing circuitry is configured to validate navigation to a selected runway by detecting a type of surface in a selected landing area based on one or more characteristics of the reflected return signals.

7. The device of claim 1, wherein the sub-area is a first sub-area, and wherein the selected radar mode for the first sub-area is an enhanced predictive wind shear (PWS) mode, wherein the processing circuitry is configured to predict wind shear events in the field of regard of the device and wherein the processing circuitry is configured to use stored data sets that include stored radar return signals to create a guard channel to reduce sidelobe clutter.

8. The device of claim 1, wherein the sub-area is a first sub-area, and wherein the selected radar mode for the first sub-area is an unmanned aerial vehicle (UAV) avoidance mode.

* * * * *